US006826474B2

(12) United States Patent
Miyahara et al.

(10) Patent No.: US 6,826,474 B2
(45) Date of Patent: Nov. 30, 2004

(54) COMMUNICATION NAVIGATION SYSTEM AND METHOD, COMMUNICATION CENTER APPARATUS, COMMUNICATION NAVIGATION TERMINAL, PROGRAM STORAGE DEVICE AND COMPUTER DATA SIGNAL EMBODIED IN CARRIER WAVE

(75) Inventors: Hiroshi Miyahara, Tokyo (JP); Akira Sakai, Saitama (JP); Ippei Nambata, Saitama (JP); Masaya Hashida, Saitama (JP); Toru Fujita, Saitama (JP)

(73) Assignees: Pioneer Corporation, Tokyo (JP); Increment P Corporation, Tokyo (JP)

( * ) Notice: Subject to any disclaimer, the term of this patent is extended or adjusted under 35 U.S.C. 154(b) by 0 days.

(21) Appl. No.: 10/231,454

(22) Filed: Aug. 30, 2002

(65) Prior Publication Data

US 2003/0060974 A1 Mar. 27, 2003

(30) Foreign Application Priority Data

Sep. 3, 2001 (JP) ....................................... 2001-266463

(51) Int. Cl.[7] ................................................ G01C 21/00

(52) U.S. Cl. ....................................... 701/209; 701/211

(58) Field of Search ................................ 701/200, 201, 701/207, 208, 209, 211, 212, 213, 214; 342/357.07, 357.06, 357.09, 357.1, 357.12, 357.13

(56) References Cited

U.S. PATENT DOCUMENTS 6,064,941 A * 5/2000 Nimura et al. .............. 701/210
6,178,378 B1 1/2001 Leibold
6,199,012 B1 3/2001 Hasegawa
6,209,026 B1 3/2001 Ran et al.

FOREIGN PATENT DOCUMENTS

| | | | |
|---|---|---|---|
| DE | 195 44 382 | A1 | 5/1997 |
| DE | 196 11 915 | A1 | 10/1997 |
| DE | 196 51 143 | A1 | 6/1998 |
| DE | 199 11 676 | A1 | 6/2000 |
| EP | 0 785 537 | A1 | 7/1997 |
| EP | 0 816 802 | A2 | 1/1998 |
| EP | 1 102 036 | A1 | 5/2001 |
| JP | 7-262493 | | 10/1995 |
| JP | 10-96644 | | 4/1998 |

OTHER PUBLICATIONS

Abstract of WO 00/36771 dated Jun. 22, 2000.
Abstract of WO 98/26395 dated Jun. 18, 1998.

* cited by examiner

*Primary Examiner*—Yonel Beaulieu
(74) *Attorney, Agent, or Firm*—Sughrue Mion, PLLC

(57) ABSTRACT

A communication navigation system is provided with a communication center apparatus (3) and a communication navigation terminal (5), which perform two-way communication on a communication network (1, 2). The communication center apparatus is provided with: a search device (74) for searching for an optimum route with respect to the request of route search from the communication navigation terminal on the basis of information for route search and a communication device (73) for wirelessly transmitting coordinates information at a plurality of positions on this optimum route. The communication navigation terminal is provided with a communication device (38) for receiving the coordinates information and a display processing device (43) for displaying the optimum route on the basis of this received coordinates information.

31 Claims, 11 Drawing Sheets

$$\begin{cases} \Delta xi = Xi - Xa \\ \Delta yi = Yi - Ya \end{cases}$$

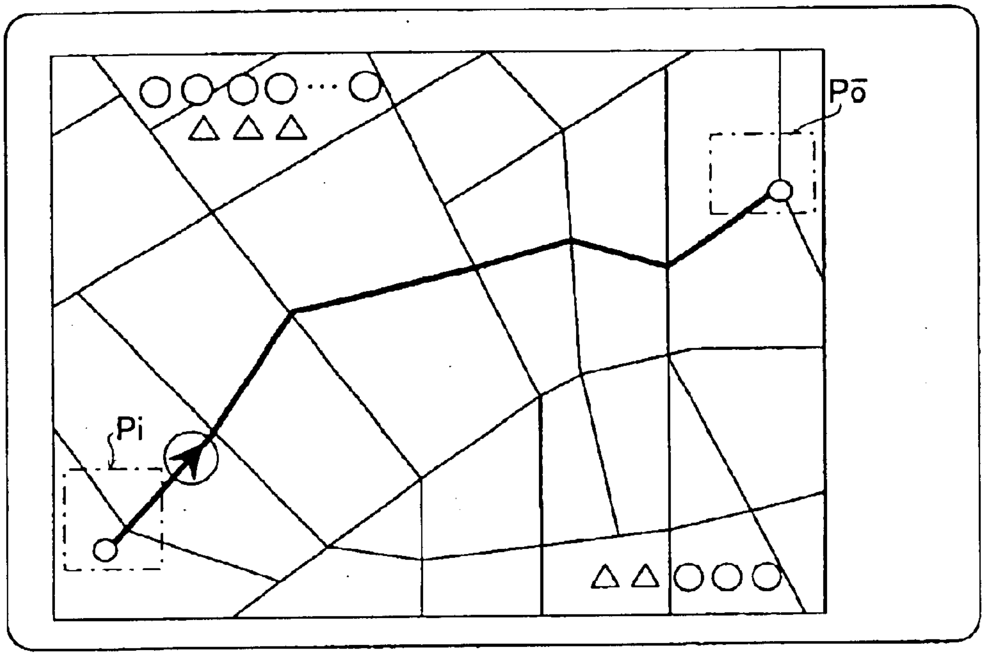
FIG. 10A
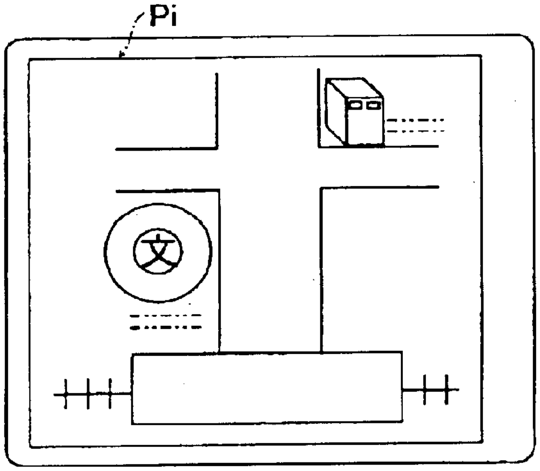
FIG. 10B
FIG. 10C
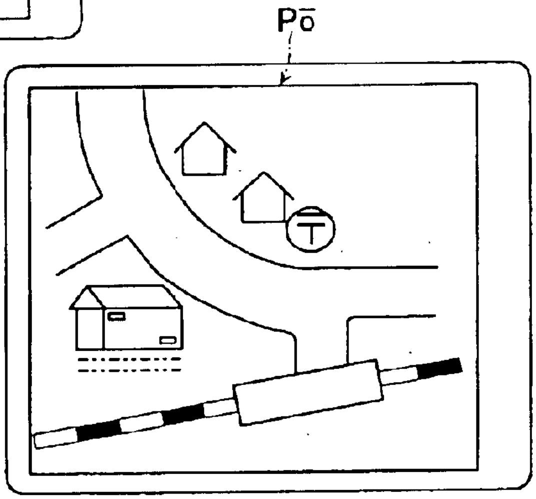

COMMUNICATION NAVIGATION SYSTEM AND METHOD, COMMUNICATION CENTER APPARATUS, COMMUNICATION NAVIGATION TERMINAL, PROGRAM STORAGE DEVICE AND COMPUTER DATA SIGNAL EMBODIED IN CARRIER WAVE

BACKGROUND OF THE INVENTION

1. Field of the Invention

The present invention generally relates to a communication navigation system and method, which execute, at a communication navigation terminal mounted on a movable body such as a vehicle or the like, a navigation operation such as presentation of an optimum route or the like by using map database information (hereunder, it is referred to as map D/B information as occasion demands) provided from a communication center apparatus for providing map information on a communication network. The present invention also relates to the communication center apparatus for providing map information, the communication navigation terminal, a program storage device, and a computer data signal embodiment in a carrier wave.

2. Description of the Related Art

Generally speaking, a navigation apparatus mounted on a vehicle has a function called "route search" or "path search" and is designed to be capable of searching for an optimum route connecting an origin and a destination, both of which are designated by a user. It is also designed to lead and guide (navigate) the user to the destination by displaying on a map a current position based on a self-contained or built-in positioning measurement or a GPS (Global Positioning System) measurement and the searched optimum route.

With respect to a traditional navigation apparatus, this kind of route search is performed by microprocessor processing in the apparatus on the basis of the map D/B information stored in a map information recording medium (e.g. DVD-ROM) set in the navigation apparatus. More concretely, the route search is executed by using "information for route search", which enables a search for the optimum route based on predetermined mathematical algorithm, such as link information corresponding to a road part between branching points and intersections, node information including coordinates information (absolute position information on latitude and longitude, or on altitude, latitude and longitude) corresponding to the branching points and the intersections of roads or the like among the map D/B information. Generally, in view of its nature of being for route search, this kind of information for route search is constructed by the link information, the node information, and the like, which are about broad areas where roads are mutually connected, for example, such as throughout Honshu or the main island of Japan, throughout Japan, or the like, so that its volume of data becomes enormous, which increases the whole amount of data of the map D/B information.

Moreover, the map D/B information includes data of added information, which is facility guidance information on tourist attractions/facilities, facility numerals, names (characters) of maps/roads, views of waters/railroads, and roads, in each one of many pieces of map information (drawings). These data as well as the above-described information for route search further increase the volume of data of the map D/B information.

By the way, the search for the optimum route requires the newest map D/B information because of changes, new constructions, and the like on roads.

Therefore, there is a need to equip for the traditional navigation apparatus a map information recording medium that stores the map D/B information which is the newest and whose data volume is enormous. At the same time, there is a need of the display processing and the search processing of an optimum route based on the complicating map D/B information. In this case, there is a need to mount a microprocessor unit (MPU), which is capable of high-speed processing, so that the scale of the processing and that of the apparatus come to increase.

On that account, various communication navigation systems are suggested in order to improve such increase of the scale of the processing and that of the apparatus. In these communication navigation systems, the map D/B information is obtained and provided through two-way wireless communication between a communication center apparatus for providing map information on a communication network and a communication navigation terminal mounted on a vehicle (e.g. refer to the examples of Japanese Patent Application Laying Open NO. Hei 7-262493 "a system for distributing map information for a movable body" and Japanese Patent Application Laying Open NO. Hei 10-96644 "a system for guiding a moving route").

In this type of the communication navigation system, the newest map D/B information can be provided all at once by updating the map D/B information at one communication center apparatus. By this type of the communication navigation system, the newest map D/B information can be provided quickly and cheaply, comparing the traditional navigation apparatus in which the newest map D/B information is provided for an individual navigation apparatus on a vehicle with the information recording medium, such as a DVD-ROM. Therefore, users side becomes able to easily receive the map D/B information including the newest information for route search or the like.

However, the above-described communication navigation system has the following disadvantage (1) to (4):

(1) In the case that radio or wireless transmission is performed from the communication center apparatus for providing map information to the communication navigation terminal, the map D/B information including the information for route search or the like, whose data volume is enormous, is wirelessly transmitted. Especially depending on a range of an origin and a destination of route search request, its data volume increase, because the route search is executed with respect to a plurality of map information (drawings). Therefore, traffic volume in a wireless section increases, and it becomes difficult to access a circuit. On that account, it becomes necessary to transmit repeatedly to access the circuit from the communication navigation terminal, which generates convergence at the communication center apparatus for providing map information, and further this makes it more difficult to access the circuit.

(2) To solve this problem, it is possible to consider installing a plurality of communication center apparatuses for providing map information on the communication network. In that case, however, the cost for administering operations may increase on the side of administrators that provide the map D/B information and the like.

(3) Moreover, if a radio transmission rate is more speeded up to solve the problem, the scales of data processing and those of apparatus of the communication navigation terminal and the communication center apparatus for providing map information will become large, which will cause the cost of each apparatus to increase.

(4) As for a communication navigation terminal mounted on a vehicle, the communication navigation terminal performs route search processing by own microprocessor. As the route search processing has many processing steps, this causes heavy load of processing in the microprocessor. Furthermore, in recent years, the navigation apparatus tends to unification with a television apparatus, an audio apparatus, and the like (i.e. multifunctionalization). The load in the microprocessor is further increased. This makes processing of the microprocessor difficult in the communication navigation terminals.

On the other hand, it is also considered that the route search is performed on the side of the communication center apparatus for providing map information. In this case, however, the necessity to wirelessly transmit arises after generating the map information, which is specially designed to include the searched optimum route in a thick line or the like, so that the volume of data to be wirelessly transmitted will become enormous. In addition, there arises a need to wirelessly transmit information for outputting as voice or sound or for outputting as image route guidance or the like (hereunder, the information is referred to as route guidance information as occasion demands), such as instructions of left turn, right turn, or straight advance and the like at each guidance position such as a turning point, a branching point, an intersection, or the like on the searched optimum route, so that the volume of data to be wirelessly transmitted will become further enormous.

For this problem, there is suggested a communication navigation system for performing distributed processing of the route search on the sides of the communication navigation terminal and the communication center apparatus for providing map information (e.g. refer to Japanese Patent Application Laying Open NO. Hei 10-300500 "apparatus for route search"). However, according to this system, each route data which becomes a candidate, their required time length (cost), and the like are transmitted from the side of the communication center apparatus for providing map information, and the route search is performed on the side of the communication navigation terminal on the basis of them, so that all of the processing become complicated and it needs complex transmission and reception of the considerate volume of data, which is a problem.

SUMMARY OF THE INVENTION

It is therefore an object of the present invention to provide a communication navigation system and a communication navigation method, which enable presentation of the optimum route at the communication navigation terminal, while restraining increase of the scale of processing or increase of the scale of an apparatus at the communication navigation terminal and decreasing the volume of data transmitted or received between the communication center apparatus and the communication navigation terminal, as well as the communication center apparatus, the communication navigation terminal, a program storage device, and a computer data signal embodiment in a carrier wave, which allow a computer to function as such a communication navigation system.

The above object of the present invention can be achieved by a communication navigation system provided with a communication center apparatus and a communication navigation terminal, which perform two-way communication on a communication network. The communication center apparatus is provided with a map database for storing therein map database information including information for route search, which enables a search for an optimum route from an origin to a destination by predetermined algorithm; a search device for searching for the optimum route with respect to route search request information that indicates the origin and the destination and that is received through the communication network, on the basis of the information for route search by the predetermined algorithm; and a center side communication device for wirelessly transmitting, through the communication network, coordinates information at a plurality of positions arranged on the searched optimum route. The communication navigation terminal is provided with: a terminal side communication device for receiving the coordinates information wirelessly transmitted; and a display processing device for displaying the optimum route on a map on the basis of the received coordinates information and map information for display.

According to the communication navigation system of the present invention, the communication center apparatus is provided with the map database. This map database stores the large-scale map database information including the information for route search such as the above-described node information, like information or the like, which enables a search for an optimum route from an origin to a destination by predetermined mathematical algorithm such as Dijkstra's algorithm and so on. When communication navigation is performed, the route search request information indicating an origin and a destination is firstly transmitted by a user communication terminal, such as a cellular phone, a mobile, a facsimile, a personal computer or the like, at a user's home. In addition, the route search request information may be transmitted by the communication navigation terminal which is carried by a user or which is mounted on a user's movable body. Secondly, the communication center apparatus receives the route search request information through the communication network. Then, at the communication center apparatus, the search device searches for the optimum route with respect to the received route search request information with the predetermined algorithm such as Dijkstra's algorithm or the like on the basis of the information for route search included in the map database information. Then, the center side communication device wirelessly transmits, through the communication network, the coordinates information at a plurality of positions arranged on the searched optimum route. The meaning of the "plurality of positions arranged on the optimum route" may include a plurality of positions which are arranged at predetermined equal or variable (irregular) intervals on the optimum route based on a map scale (i.e. in such a way that the arrangement of the plurality of position matches on the map). Alternatively, it may include a plurality of positions which are arranged at predetermined equal or variable (irregular) intervals independently of a map scale (i.e. on the real ground). Alternatively, it may include a plurality of positions which are arranged on or in the vicinity of a grid of a map according to a map resolution. Moreover, it may include a plurality of positions placed at connecting positions of parts of the optimum route (i.e. at positions at each of which the angle of a linear line changes) in the case of the approximation of the each part of the optimum route with the linear line. Furthermore, it may include a plurality positions arranged on the optimum route according to various other methods or rules. Namely, method of arrangement of the plurality of positions is not restricted. On the other hand, the meaning of the "coordinates information" is information that allows specification of a location (coordinates) of each position somehow on a map shown with the map information for display, such as coordinates information that indicates an absolute location on each position, coordinates information that indicates a relative location with the absolute location as a standard, coordinates information that is one-dimensional, indicating a distance from the standard position on the optimum route, and so on.

On the side of the communication navigation terminal, the terminal side communication device receives the wirelessly transmitted coordinates information. Then, the display processing device displays the optimum route on the map on the basis of the map information for display and the received coordinates information. Between the coordinates information and road data (e.g. which is constructed by the collection of the node information and link information) in the map information, there is no particular relation or special connection. However, since coordinates such as latitude and longitude are common between maps, positions indicated by the coordinates information can be specified on a road map in the map information. Namely, if the plurality of positions shown by the coordinates information are plotted on the map based on the map information for display, accordingly, these plotted plurality of positions are arranged on the same route as the optimum route searched on the side of the communication center apparatus. In this case, even if the map scale differs on the side of the communication center apparatus and on the side of the communication navigation terminal, the coordinates, for example, latitude and longitude are in common between maps. Therefore, if the plurality of positions are plotted on a map of an arbitrary scale on the side of the communication navigation terminal, they are placed on the same route as the optimum route searched on the basis of the communication center apparatus after all. As a result, if a map on which the plurality of positions are plotted with certain types of marks and the like is displayed on a display screen, the basic desire of presenting the optimum route from the user is satisfied.

In addition, at the communication navigation terminal, it becomes possible to recognize the optimum route as the road data corresponding to the optimum route not only by plotting the plurality of positions on the map, but by specifying or choosing a route which includes the plurality of positions and which heads to the destination from the origin, i.e. by mapping the plurality of positions onto a road. Especially if the mapping is performed, even if the plurality of positions are plotted at positions in some degree off the road because of errors, inaccuracy of the map, and the like, it becomes possible to specify the optimum route constructed by a series of roads. In this manner, the recognition of the optimum route as the road data on the side of the communication navigation terminal can cause easier performance of various data processing such as, for example, provision processing of route guidance information giving instructions of direct advance, right turn, left turn, and the like at an intersection and the like.

Incidentally, the map information for display used in the display processing by the display processing device may be read out from a storing device such as a DVD or the like provided for the communication navigation terminal. Alternatively, it may be transmitted in advance or with the coordinates information at the same time from the communication center apparatus. In this case again, as for the map information for display, it is possible to plan to decrease its data volume to be transmitted and received as long as it is transmitted separately from the information for route search, whose data volume is enormous as described above.

As described above, in the communication navigation system of the present invention, it is not necessary to wirelessly transmit through the communication network the information for route search whose data volume is enormous as described above and the map database information including this information. Moreover, it is not necessary to newly generate the map information in which the searched optimum route is shown in a thick line or the like to wirelessly transmit it through the communication network. In addition, it is possible to perform the transmission and the reception of the coordinates information more easily than those of the above described distribution processing.

Accordingly, it is possible to decrease the volume of data, which are transmitted and received between the communication center apparatus and the communication navigation terminal, as well as presenting the optimum route at the communication navigation terminal while restraining increase of the scale of the processing and that of the apparatus at the communication navigation terminal.

Therefore, it is possible to effectively avoid the situation that the volume of traffic between wireless sections increases and that it becomes difficult to access circuits, so that one or a few communication center apparatuses can deal with the processes of many communication navigation terminals. Consequently, communication navigation companies can hold down the cost of operation administration. Moreover, since it is not necessary to speed up a wireless transmission, the apparatus performance of the communication navigation terminal and that of the communication center apparatus are relatively low, so that it is possible to plan low cost of the whole system. In addition, as for the communication navigation terminal, it is possible to plan low cost, considering that the processing capacity of a processor can be distributed into more functions such as a television function, an audio function, and the like because of reduction of load of processing on a navigation operation including the relevant communication operation or the like.

In one aspect of the communication navigation system of the present invention, the terminal side communication device transmits the route search request information and the center side communication device receives the route search request information.

According to this aspect, the terminal side communication device provided for the communication navigation terminal carried by the user or mounted on the user's movable body firstly transmits the route search request information and the center side communication device secondly receives this route search request information. Then, the optimum route is searched for on the basis of this, so that it becomes possible to present the optimum route at the communication navigation terminal, while decreasing the volume of data, which are transmitted and received on the communication network, when the user actually starts moving or while moving.

Another aspect of the communication navigation system of the present invention, the communication navigation system may include a user communication terminal, which performs two-way communication on the communication network and which transmits the route search request information.

According to this aspect, the user communication terminal such as a cellular phone, a mobile, a facsimile, a personal computer, or the like installed at the user's home firstly transmits the route search request information and the center side communication device secondly receives this route search request information. Then, the optimum route is searched for on the basis of this, so that it becomes possible to request the optimum route before the user actually starts moving, and thereafter, it becomes possible to present the optimum route at the communication navigation terminal when the user actually starts moving and while moving.

In another aspect of the communication navigation system of the present invention, the center side communication device further transmits order information that indicates order of the plurality of positions arranged on the optimum route, and the display processing device displays the optimum route on the basis of the order information in addition to the coordinates information.

According to this aspect, on the side of the communication navigation terminal, it becomes easy to specify or choose the same route as the optimum route on the map based on the map information for display using not only the coordinates information at the plurality of positions but the order information indicating arrange order on the optimum route on the plurality of positions. Especially, in the case that complicated roads such as city streets or the like are included in the optimum route, the fact that the arrange order of the plurality of positions are given and known helps the route specification.

In another aspect of the communication navigation system of the present invention, the coordinates information includes latitude and longitude, or latitude, longitude and altitude at the plurality of positions on the optimum route.

According to this aspect, on the side of the communication navigation terminal, the display processing device can specify the plurality of position on the optimum route on a map according to the latitude and longitude, or latitude, longitude and altitude, so that it is possible to improve accuracy of displaying the optimum route on the map.

In another aspect of the communication navigation system of the present invention, the route search request information indicates at least one passing place that exists between the origin and the destination and that is intended to be passed through in addition to the origin and the destination, and the search device searches for the optimum route with respect to the route search request information indicating the origin, the destination and the at least one passing place.

According to this aspect, one or a plurality of passing places in addition to the origin and the destination are transmitted from the user communication terminal and the communication navigation terminal. Then, the search device searches for the optimum route heading to the destination from the origin through the one or the plurality of passing places. Therefore, the communication navigation system of the present invention can fully demonstrates its effect not only when simply going to the destination, but when going to the destination such as a hotel, a home, or the like, after stopping at one or a plurality of tourist spots, restaurants, souvenir stores, and the like.

In another aspect of the communication navigation system of the present invention, the coordinates information includes information that indicates absolute coordinates of at least one of the plurality of positions on the optimum route, and information that indicates relative coordinates of at least another one of the plurality of positions on the optimum route with respect to the absolute coordinates.

According to this aspect, the coordinates information transmitted from the communication center apparatus to the communication navigation terminal includes absolute coordinates information, such as (X, Y) or (X, Y, Z), and relative coordinates information, such as ($\Delta x$, $\Delta y$, $\Delta z$). The relative coordinates information indicates a position or positions on the optimum route with a variation with respect to the absolute coordinate of another position (a standard position) indicated by the absolute coordinates information. When the relative coordinates information on a certain position is created, if the absolute coordinates of a different position closest to this position, such as the closest position located on the side of the origin or located on the side of the destination, is used as a standard, the value of the relative coordinates information, namely, the variation between this position and the position used as the standard, may be small. Moreover, according to this aspect, as the relative coordinates information which is relatively small is used, the processing of specification or choice of the optimum route on the map on the side of the display processing device can be simplified. Therefore, it is possible to decrease the volume of data to be transmitted and received more than transmitting all coordinates information with the absolute coordinates information.

In another aspect of the communication navigation system of the present invention, the number of the plurality of positions is varied with a scale of a map corresponding to map information used for the search for the optimum route at the search device.

According to this aspect, the number of the plurality of positions can be changed depending on the map scale of the map database information used for the search for the optimum route by the search device. More concretely, for example, if the scale is small, more positions are programmed to be thinned out from among the plurality of positions such as an intersection, a branching point, and the like. Alternatively, if the scale is large, fewer positions are programmed to be thinned out or not to be thinned out at all. Consequently, it is possible to avoid the fact that the data volume unnecessarily increases because of the transmission of the coordinates information associated with many positions which do not match well with the scale of the map information for display used by the display processing device on the side of the communication navigation terminal. Alternatively, it is possible to avoid the fact that the optimum route cannot be displayed because of the transmission of the coordinates information associated with small number of positions which do not match well with the scale of the map information for display used by the display processing device.

In another aspect of the communication navigation system of the present invention, the map database information includes map information having a scale equal to that of the map information for display to be used at the display processing device, and the search device searches for the optimum route on the basis of the map information included in the map database information.

According to this aspect, the search device searches for the optimum route on the basis of the map information of the same scale as that of the map information for display used by the display processing device, and then, the center side communication device transmits the coordinates information of a plurality of positions on the searched optimum route, and then, the display processing device of the communication navigation terminal displays the optimum route on a map on the basis of this coordinates information. When the display processing device displays the optimum route on the map on the basis of the coordinates information, as the map information used by the search device of the communication center apparatus is equal to the map information used by the display processing device of the communication navigation terminal in scale, the plurality of positions on the optimum route based upon the coordinates information matches between both map information. Therefore, the number of positions necessary for specifying the optimum route in the process of the search device is identical to that necessary for specifying and displaying the optimum route on the map in the process of the display processing device. Consequently, it is possible to precisely display the optimum route on the side of the communication navigation terminal, while transmitting and receiving data extremely efficiently.

In another aspect of the present invention, the communication navigation system may be constructed such that the center side communication device receives scale information indicating a scale of the map information for display to be used at the display processing device together with the route search request information, and the search device selects map information having a scale equal to that indicated by the received scale information from among a plurality of map information having various scales, and searches for the optimum route on the basis of the selected map information.

According to this aspect, on the side of the communication center apparatus, the search for the optimum route can be surely performed by using the map information having the scale equal to that of the map information used at the display processing device in scale.

In another aspect of the communication navigation system of the present invention, the center side communication device transmits scale information that indicates a scale of map information which is used for the search for the optimum route at the search device.

According to this aspect, the display processing device can specify or choose the optimum route with respect to the map information for display relatively efficiently in accordance with the scale information (e.g. scale flag) of the map information which is used when the search device searches for the optimum route and which is transmitted from the center side communication device. Especially, even if the scale of a display map changes on the side of the communication navigation terminal, the reference of this scale information can cause easy mapping onto a road and plotting onto a map of the plurality of positions based on the coordinates information. Moreover, if it is turned out to be the same scale on the side of the communication navigation terminal before the display processing, it is possible to perform the specification or the choice of the optimum route on the map information for display by the display processing device extremely quickly and easily.

In another aspect of the communication navigation system of the present invention, the route search request information comprises screen information including character information, and is transmitted and received according to a two-way communication method.

According to this aspect, as the route search request information, screen information is transmitted and received according to a two-way communication method (a screen information two-way communication method). The screen information includes character information used in the browser, such as input processing of an origin, a destination or the like. Thus, the request of route search can be surely performed by using the user communication terminal and the communication navigation terminal.

In another aspect of the communication navigation terminal of the present invention, the route search request information includes character information, and is transmitted and received according to a one-way communication method.

According to this aspect, the route search request information including the character information is transmitted and received according to a one-way communication method. The character information is, for example, information used for a facsimile transmission operation or the like. Thus, the route search can be surely requested by using the user communication terminal and the communication navigation terminal independently of operation conditions or the like of the communication center apparatus. Especially, even if it is impossible to communicate in two way on the communication network because of circuit congestion, the route search can be requested, which is useful.

In another aspect of the communication navigation terminal of the present invention, the route search request information includes transmission time information indicating a time point supposed to transmit the coordinates information, the communication center apparatus further comprises a timing device for measuring a time point shown by the transmission time information and the center side communication device transmits the coordinates information at the time point shown by the transmission time information according to the time measurement by the timing device.

According to this aspect, the communication center apparatus transmits the coordinates information defining the optimum route searched by the search device not immediately after completing the search but following the transmission time information added to the optimum route request information. Namely, the timing device measures a time point shown by this transmission time information and the center side communication device transmits the coordinates information at the time point supposed to transmit. Therefore, even when the communication navigation terminal to be mounted on a vehicle or the like is powered off, the route search can be requested in advance by a user terminal apparatus or the like separately and the coordinates information corresponding to the optimum route can be received later when needed such as when starting to drive, while driving, and so on. Then, this makes it possible to display the optimum route when needed, which is extremely useful in practice.

The above-described object of the present invention can be achieved by a communication center apparatus for performing two-way communication on a communication network with a communication navigation terminal provided with: a terminal side communication device for receiving coordinates information wirelessly transmitted; and a display processing device for displaying an optimum route from an origin to a destination on a map on the basis of the received coordinates information and map information for display. The communication center apparatus is provided with: a map database for storing therein map database information including information for route search, which enables a search for the optimum route by predetermined algorithm; a search device for searching for the optimum route with respect to route search request information that indicates the origin and the destination and that is received through the communication network, on the basis of the information for route search by the predetermined algorithm; and a center side communication device for wirelessly transmitting, through the communication network, the coordinates information at a plurality of positions arranged on the searched optimum route.

According to this aspect, as is the case of the above-described communication navigation system of the present invention, it is possible to decrease the volume of data, which are transmitted and received between the communication center apparatus and the communication navigation terminal, as well as presenting the optimum route at the communication navigation terminal while restraining increase of the scale of the processing and that of the apparatus at the communication navigation terminal.

Incidentally, as is the case of the above-described communication navigation system of the present invention, various aspects are available to the communication center apparatus of the present invention.

The above object of the present invention can be achieved by a communication navigation terminal for performing two-way communication on a communication network with a communication center apparatus provided with: a map database for storing therein map database information including information for route search, which enables a search for an optimum route from an origin to a destination by predetermined algorithm; a search device for searching for the optimum route with respect to route search request information that indicates the origin and the destination and that is received through the communication network, on the basis of the information for route search by the predetermined algorithm; and a center side communication device for wirelessly transmitting, through the communication network, coordinates information at a plurality of positions arranged on the searched optimum route. The communication navigation terminal is provided with a terminal side communication device for receiving the coordinates information wirelessly transmitted; and a display processing device for displaying the optimum route on a map on the basis of the received coordinates information and map information for display.

According to the communication navigation terminal of the present invention, as is the case of the above-described communication navigation system of the present invention, it is possible to decrease the volume of data, which are transmitted and received between the communication center apparatus and the communication navigation terminal, as well as presenting the optimum route at the communication navigation terminal while restraining increase of the scale of the processing and that of the apparatus at the communication navigation terminal.

Incidentally, as is the case of the above-described communication navigation system of the present invention, various aspects are available to the communication navigation terminal of the present invention.

The above object of the present invention can be achieved by a communication navigation method executed in a communication navigation system comprising a communication center apparatus and a communication navigation terminal, which perform two-way communication on a communication network. The communication navigation method is provided with: (i) at the communication center apparatus: a search process of searching, by a predetermined algorithm, for an optimum route from a origin to a destination with respect to route search request information that indicates the origin and the destination and that is received through the communication network, on the basis of information for route search which is included in map data base information stored in a map database and which enables a search for the optimum route from the origin to the destination according to the predetermined algorithm; and a center side communication process of wirelessly transmitting, through the communication network, coordinates information at a plurality of positions arranged. On the searched optimum route, and (ii) at the communication navigation terminal: a terminal side communication process of receiving the coordinates information wirelessly transmitted; and a display process of displaying the optimum route on a map on the basis of the received coordinates information and map information for display.

According to the communication navigation method of the present invention, as is the case of the above-described communication navigation system of the present invention, it is possible to decrease the volume of data, which are transmitted and received between the communication center apparatus and the communication navigation terminal, as well as presenting the optimum route at the communication navigation terminal while restraining increase of the scale of the processing and that of the apparatus at the communication navigation terminal.

Incidentally, as is the case of the above-described communication navigation system of the present invention, various aspects are available to the communication navigation method of the present invention.

The above object of the present invention can be achieved by a program storage device readable by a computer for tangibly embodying a program of instructions executable by the computer to perform a communication navigation method at a communication center apparatus in the above-described communication navigation system (including its various aspects), more concretely, at various component devices such as the center side communication device, the search device, the map database, or the like, provided for the communication center apparatus associated with the above-described present invention.

The program storage device on which the computer program is recorded is such as a CD-ROM (Compact Disc-Read Only Memory), a DVD-ROM (DVD Read Only Memory), a hard disk, a floppy disk or the like. The communication center apparatus associated with the present invention can be relatively easily realized as a computer reads and executes the computer program of instructions or as it executes the program after downloading the program through a communication interface or the like. Moreover, this kind of program can be transmitted from another server apparatus with other data such as video information data, audio information data, map data, and so on.

The above object of the present invention can be achieved by a program storage device readable by a computer for tangibly embodying a program of instructions executable by the computer to perform a communication navigation method at a communication navigation terminal in the above-described communication navigation system (including its various aspects), more concretely, at various component devices such as the terminal side communication device, the display processing device, or the like, provided for the communication navigation terminal associated with the above-described present invention.

The program storage device on which the computer program is recorded is such as a CD-ROM (Compact Disc-Read Only Memory), a DVD-ROM (DVD Read Only Memory), a hard disk, a floppy disk or the like. The communication navigation terminal associated with the present invention can be relatively easily realized as a computer reads and executes the program or as it executes the program after downloading the program through a communication interface or the like. Moreover, this kind of program can be transmitted from another server apparatus with other data such as video information data, audio information data, map data, and so on.

The above object of the present invention can be achieved by a computer data signal embodied in a carrier wave and representing a series of instructions which cause a computer to perform a communication navigation method at a communication center apparatus in the above-described communication navigation system (including its various aspects), more concretely, at various component devices such as the center terminal communication device, the search device, the map database, or the like, provided for the communication center apparatus associated with the above-described present invention.

According to this computer data signal embodied in the carrier wave of the present invention, as the computer downloads the program in the computer data signal through a computer network or the like, and executes this program, it is possible to realize the communication center apparatus associated with the present invention. Moreover, this kind of program can be transmitted from another server apparatus with other data such as video information data, audio information data, map data, and so on.

The above object of the present invention can be achieved by a computer data signal embodied in a carrier wave and representing a series of instructions which cause a computer to perform a communication navigation method at a communication navigation terminal in the above-described communication navigation system (including its various aspects), more concretely, at various component devices such as the terminal side communication device, the display processing device, or the like, provided for the communication navigation terminal associated with the above-described present invention.

According to the computer data signal embodied in the carrier wave of the present invention, as the computer downloads the program in the computer data signal through a computer network or the like, and executes this program, it is possible to realize the communication navigation terminal associated with the present invention. Moreover, this kind of program can be transmitted from another server apparatus with other data such as video information data, audio information data, map data, and so on.

The nature, utility, and further features of this invention will be more clearly apparent from the following detailed description with reference to preferred embodiments of the invention when read in conjunction with the accompanying drawings briefly described below.

BRIEF DESCRIPTION OF THE DRAWINGS

FIG. 10A to FIG. 10C are schematic diagrams to explain a road map displaying an optimum route in the first embodiment.

DETAILED DESCRIPTION OF THE PREFERRED EMBODIMENTS

Figure 1:
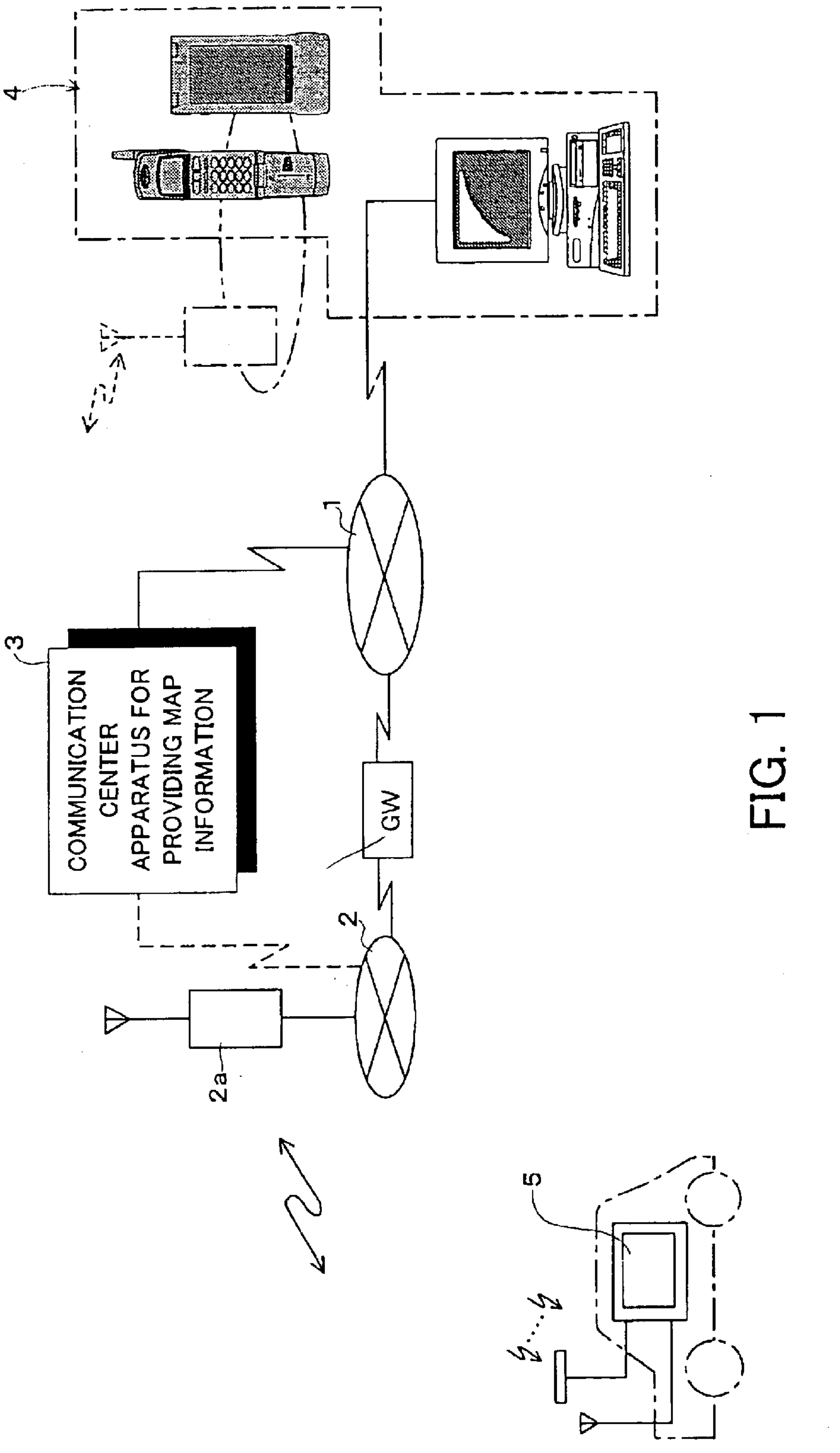
FIG. 1 is a block diagram showing the whole structure of a communication navigation system in a first embodiment of the present invention.

Referring to the accompanying drawings, embodiments associated with a communication navigation system and a communication navigation method, a program storage device, and a computer data signal embodiment in a carrier wave of the present invention will be now explained. Incidentally, each embodiment, which will be described below, is intended to establish the communication navigation system of the present invention as a system that can present an optimum route on a road map at an on-vehicle communication navigation terminal by using the communication center apparatus for providing map information (1) First Embodiment Firstly, the whole structure of the communication navigation system in the first embodiment will be explained with reference to FIG. 1. FIG. 1 is a block diagram showing the whole structure of the communication navigation system in the first embodiment.

In FIG. 1, a digital fixed communication circuit network 1 and a digital mobile communication network 2 (hereunder, the two communication networks are collectively referred to as a communication circuit network as occasion demands), both of which are connected with a gateway (GW) device for communication protocol conversion, are provided in the first embodiment. On this communication circuit network, IP (Internet Protocol) packet communication is performed under TCP/IP (Transmission Control Protocol/Internet Protocol) environment (e.g. the Internet).

The digital fixed communication circuit network 1 is connected to a communication center apparatus 3 for providing map information, a personal computer and the like. The communication center apparatus 3 is owned by communication navigation companies, for example. The personal computer is installed at a user's home. This personal computer is one example of a communication terminal 4 for users.

At a cell base station 2*a* of the digital mobile communication network 2, a cellular phone, a mobile or hand-carry type information terminal/PDA (Personal Digital Assistants), and the like are accommodated through a wireless section (air interface). An on-vehicle communication navigation terminal 5 mounted on the user's vehicle is accommodated through the air interface. Incidentally, the cellular phone, and the mobile or hand carry type information terminal/PDA are other examples of the communication terminal 4.

The communication center apparatus 3 is constructed to perform maintenance and preservation, which have been traditionally performed at an on-vehicle navigation apparatus, of the newest map database information including the map information for display of various scales, the information for route search, and the like, which will have enormous data volume. Moreover, it is designed to perform the search processing of the optimum route, whose load of processing is heavy, in place of the on-vehicle navigation apparatus.

The communication terminal 4 is constructed to request the communication center apparatus 3 to provide the map information, to search for the optimum route, and so on. Moreover, it is constructed to give instructions of where to transmit the requested map information or the like. Incidentally, the request and the instruction of where to transmit described above can be performed from the communication navigation terminal 5 in the same manner as those from the communication terminal 4.

The communication navigation terminal 5 is for vehicle use. The communication navigation terminal 5 downloads the map information that is minimally required for display from among the map database information of the communication center apparatus 3 at least when displaying a map during a navigation operation. The communication navigation terminal 5 is equipped with a recording medium, such as a CD, a DVD, or the like, and stores the downloaded map information for display onto such a recording medium. Then, along with displaying the road map by using the downloaded map information, the communication navigation terminal 5 displays the optimum route to a destination, a location of a vehicle, a moving direction, scale circle/radius, a driving locus, a map direction or orientation, and the like.

The communication center apparatus 3, the communication terminal 4, and the communication navigation terminal 5 are equipped with a communication application program (for example, including Web browser), which will be explained in detail later.

Incidentally, the communication network in FIG. 1 is not especially limited to the TCP/IP method, and various data communication methods are available. It also allows the use of an analog fixed communication circuit network instead of the digital fixed communication circuit network 1.

Figure 2:
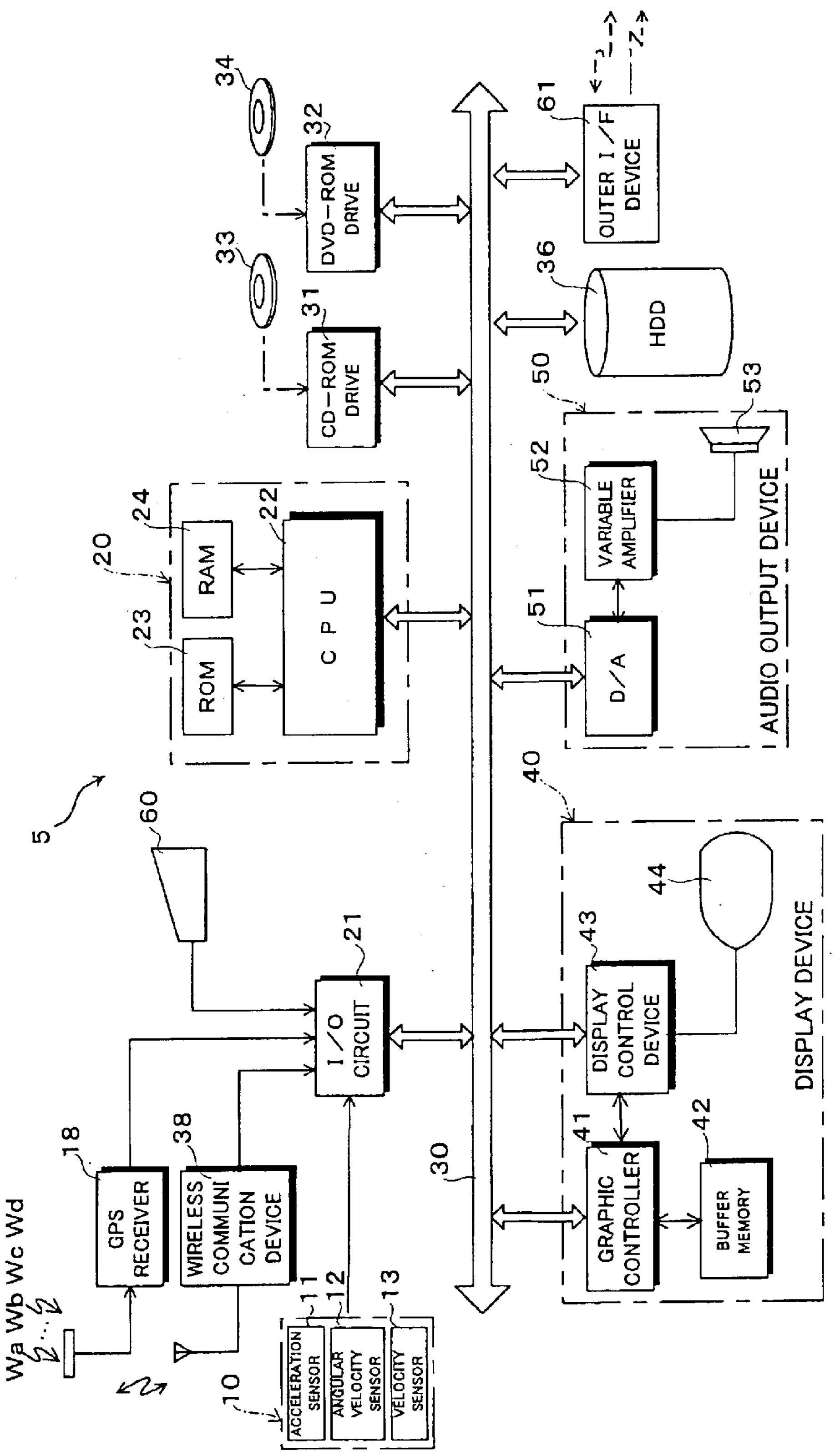
FIG. 2 is a block diagram showing an example of the inner structure of a communication navigation terminal shown in FIG. 1 in the first embodiment.

Next, the communication navigation terminal 5 shown in FIG. 1 will be further explained with reference to FIG. 2. FIG. 2 is a block diagram showing an example of the inner structure of the communication navigation terminal shown in FIG. 1.

In FIG. 2, this communication navigation terminal 5 is provided with a self-contained positioning apparatus 10, a GPS receiver 18, a system controller 20, an input and output (I/O) circuit 21, a CD-ROM drive 31, a DVD-ROM drive 32, a hard disk device (HDD) 36, a wireless communication device 38, a display device 40, an audio output device 50, an input device 60, and an outer interface (I/F) device 61. Each component is connected to a bus line 30 for communicating processing data and control data.

In this embodiment, the wireless communication device 38 constructs one example of a terminal side wireless device, and the display device 40 constructs one example of a display processing device with the system controller 20 or the like The self-contained positioning apparatus 10 is constructed by an acceleration sensor 11, an angular velocity sensor 12, and a velocity sensor 13. The acceleration sensor 11, which is constructed by a piezoelectric element, for example, outputs acceleration data obtained by detection of the acceleration of a vehicle. The angular velocity sensor 12, which is constructed by a vibration gyro, for example, outputs angular velocity data and relative azimuth data obtained by detection of the angular velocity of a vehicle when the vehicle changes its moving direction. The velocity sensor 13 detects the rotation of a vehicle shaft mechanically, magnetically, or optically and outputs signals of the number of pulses corresponding to a vehicle speed at every rotation for a predetermined angle around a vehicle shaft.

The GPS receiver 18 has a known structure, provided with a microprocessor unit (MPU) or a digital signal processor (DSP), memory devices, and the like, as well as a high frequency reception processing device and a plane polarization non-directional receiving antenna. The GPS receiver 18 is constructed to receive electric waves Wa to Wc (when desired to obtain more reliable values, four electric waves Wa to Wd) from at least three GPS satellites placed into orbit around the earth, to perform back-diffusion of spectra, distance measurement, Doppler measurement, and orbital data processing, and to continuously output absolute position information of a reception position (a driving position of a vehicle) from the I/O circuit 21 to the bus line 30 after calculation of a moving velocity/azimuth and that of a location. The system controller 20 incorporates and displays it on the map road.

The system controller 20 is constructed by a CPU (Central Processing Unit) 22, a ROM (Read Only Memory) 23, which is a non-volatile solid storage element, and a RAM (Random Access Memory) 24 for working. The system controller 20 performs data communication with each component connected to the bus line 30. The data communication processing is executed by a control program and a boot program stored in the ROM 23. The RAM 24 temporarily stores setting information, which changes map display (changes it to a full-scale or local map display) by the user's operation from the input device 60, especially.

The CD-ROM drive 31 and the DVD-ROM drive 32 read out from a CD-ROM 33 and a DVD-ROM 34 and output the map D/B information (e.g. various road data, such as a road width, the number of traffic lanes, or the like, on map information (drawings)), which is stored in both the CD-ROM 33 and the DVD-ROM 34.

Incidentally, it is possible to install either one of the CD-ROM drive 31 and the DVD-ROM drive 32, and it is also possible to install one compatible drive. If all data can be incorporated to the communication navigation terminal 5 through communication, it becomes unnecessary to have the map database at the communication navigation terminal 5 in advance, so that it is also possible not to install the CD-ROM drive 31 or the DVD-ROM drive 32, and further a high-capacity memory device such as a hard disk device or the like.

The hard disk device 36 can store map (image) data, which are read by the CD-ROM drive 31 or the DVD-ROM drive 32, and after this storing, it can read out them at an arbitrary time. The hard disk device 36 can further store video data and audio data, both of which are read by the CD-ROM drive 31 and the DVD-ROM drive 32. Because of this, for example, it becomes possible to read out the video data and the audio data stored in the hard disk device 36 and output them as video and as sound, while reading out the map data on the CD-ROM 33 and the DVD-ROM 34 to perform the navigation operation. Alternatively, it becomes possible to read out the map data stored in the hard disk device 36 to perform the navigation operation, while reading out the video data and the audio data on the CD-ROM 33 and the DVD-ROM 34 and outputting them as video and as sound. Moreover, it becomes possible to output by storing in the hard disk device 36 the map data, the video data, or the audio data, which are downloaded by the wireless communication device 38, and then reading out them at an arbitrary time.

The wireless communication device 38 has the same structure as that of a general-purpose cellular phone, which is known as TDMA, TDD, or CDMA structure (a high-frequency wireless transmitting/receiving device, an encoding/decoding device, a time division multiplexing device, a control device, an audio input/output device, and the like) in the manner of PDC (Personal Digital Cellular Telecommunication System) or PHS (Personal Handyphone System), for example.

The display device 40 displays various processing data under the control of the system controller 20. A graphic controller 41 inside the display device 40 controls each component of the display device 40 on the basis of the control data transmitted from the CPU 22 through the bus line 30. Moreover, a buffer memory 42 using the V-RAM or the like temporarily memorizes immediately-displayable image information. Furthermore, along with a display control device 43 controlling display, a display 44, which is constructed by a liquid crystal display (LCD), an EL (Electro-Luminescence), or a CRT (cathode-ray tube), displays the image data outputted from the graphic controller 41. This display 44 is installed in the vicinity of a front panel in a vehicle, for example.

At the audio output device 50, a variable amplifier (AMP) 52 variably amplifies an audio analog signal outputted from a D/A converter 51 and outputs it to a speaker 53, from which it is outputted as sound, with the D/A converter 51 converting into a digital signal an audio signal transmitted through the bus line 30 under the control of the system controller 20.

The input device 60 is provided with a key, a switch, a button, a remote controller, an audio input device, and so on, to input various types of commands and data. The input device 60 is installed in the vicinity of the display 44 or a front panel of a main body of the communication navigation terminal loaded into a vehicle.

Incidentally, the communication navigation terminal 5 is not limited to the above-described structure. For example, the GPS receiver 18 is built in the communication navigation terminal 5 and is wired and connected to the I/O circuit 21; however, it is also possible to employ such a structure that a general-purpose mobile or hand-carry type GPS receiver is wired and connected (interface connected) to the outer I/F device 61 or such a wireless connection manner that allows the installation of a weak radio transmitting/receiving device (e.g. Bluetooth frequency hopping communication manner) at the outer I/F device 61 and the general-purpose mobile or hand-carry type GPS receiver.

In the same manner as the GPS receiver 18 does, the wireless communication device 38 can also employ such a structure that a general-purpose mobile or hand-carry type cellular phone is wired and connected (interface connected) to the outer I/F device 61 or such a wireless connection manner that allows the installation of a weak radio transmitting/receiving device at the outer I/F device 61 and the general-purpose mobile or hand-carry type cellular phone.

Moreover, the input device 60 can also employ an infrared ray remote control manner and/or the same weak radio transmission/reception manner as those of the wireless communication device 38 and the GPS receiver 18. The infrared ray remote control manner is designed such that it uses a remote controller to perform infrared ray remote manipulation by user's hands, with an infrared ray reception device and a decoder built in the communication navigation terminal 5 (in general, they are installed in the vicinity of the display 44).

Figure 3:
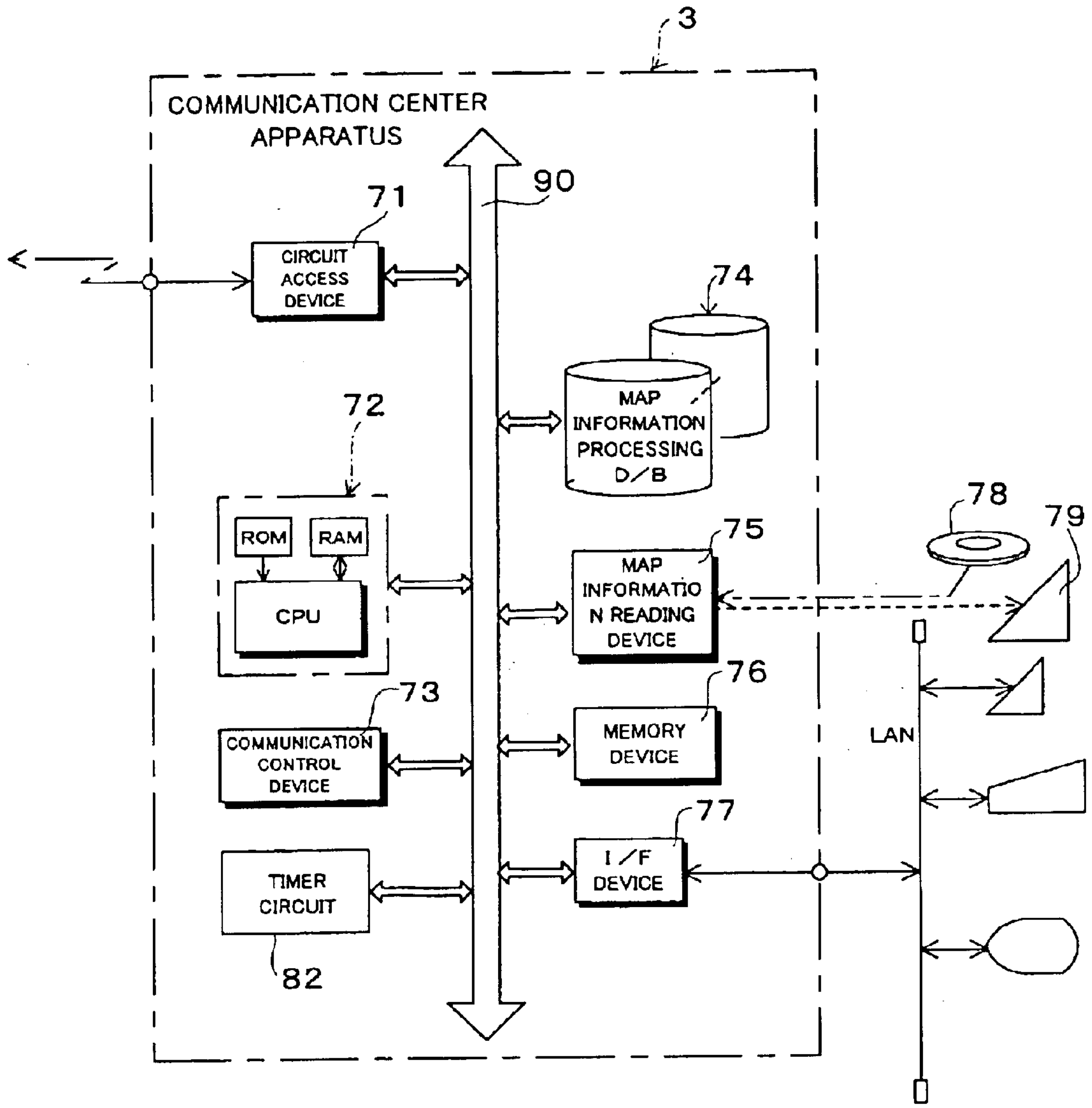
FIG. 3 is a block diagram showing an example of the inner structure of a communication center apparatus for providing map information shown in FIG. 1 in the first embodiment.

Next, the communication center apparatus 3 shown in FIG. 1 will be further explained with reference to FIG. 3. FIG. 3 is a block diagram showing an example of the inner structure of the communication center apparatus 3.

In FIG. 3, this communication center apparatus 3 is provided with a circuit access device 71, a microprocessor 72, a communication control device 73, a map information processing D/B device 74, a map information reading device 75, a memory device 76, an interface (I/F) device 77, a DVD-ROM 78 (a CD-ROM is also available), a communication terminal 79, a timer circuit 82, and a bus line 90.

In this embodiment, the communication control device 73 constitutes one example of a center side wireless device, and the map information processing D/B device 74 does one example of a search device, and the timer circuit 82 does one example of a timing device.

The circuit access device 71 is intended to accommodate the communication center apparatus 3 in the digital fixed communication circuit network 1, and it is provided with a DSU (Digital Service Unit), which is a terminating device, a router, a firewall, and the like, for example. Incidentally, the circuit access device 71 is equipped with a network control unit (NCU), a modulator-demodulator (modem), and the like in the case of using an analog fixed communication circuit network instead of the digital fixed communication circuit network 1 in FIG. 1.

The microprocessor 72 is provided with a ROM, a working RAM, and a CPU. The microprocessor 72 controls each component of the communication center apparatus 3 on the basis of a program, and its control data and processing data are exchanged through the bus line 90. The microprocessor 72 further works with the map information processing D/B device 74 to execute various data processing such as the search processing of the optimum route or the like, which will be explained later.

The communication control device 73 works with the circuit access device 71 to execute communication protocol with the communication circuit network. For example, it executes TCP/IP.

The map information processing D/B device 74 stores the map D/B information including the map information for display of various scales, the information for route search constructed by the link information, the node information, and the like, which have enormous data volumes and which cover road networks spread in a broad area such as throughout Honshu or the main island of Japan or throughout Japan and so on. Moreover, the map information processing D/B device 74 uses this map D/B information to execute data processing, such as the search processing of the optimum route or the like, with the microprocessor 72.

The map information reading device 75 operates as a drive, which reads out the map D/B information from the CD-ROM or DVD-ROM 78. The map D/B information from the CD-ROM or DVD-ROM 78 is transmitted to and stored in the map information processing D/B device 74 through the bus line 90. The map D/B information at the map information processing D/B device 74 is updated by reading out data from the CD-ROM or DVD-ROM 78, which stores the newest map D/B information.

The memory device 76 holds information on setting an apparatus and a variable in control processing of the microprocessor 72 transmitted through the bus line 90.

The I/F device 77 accommodates an outer LAN (Local Area Network) to execute information processing and maintenance of various types such as replacement of the map D/B information at the map information reading device 75.

The communication terminal 79 is intended to incorporate the map D/B information instead of the CD-ROM or DVD-ROM 78. For example, it is intended to download (receive) on-line the map D/B information provided from a map information preparing company or association to install it in the map information processing D/B device 74. Therefore, the map D/B information at the map information processing D/B device 74 may be updated through the communication terminal 79.

Incidentally, in the case that this communication center apparatus 3 is used as the Internet, it will be a portal site structure. For example, it is provided with a Web server, a FTP (File Transfer Protocol) file transmitting server, a DNS (Domain Name System) server, a FAX/e-mail server, and so on.

A cellular phone as the communication terminal 4 shown in FIG. 1 also has a structure known as the PDC manner and the PHS manner (TDMA, TDD, or CDMA). The PDA or a compact general-purpose computer as the communication terminal 4 also has a familiar structure and performs familiar operations, and each detailed explanation will be omitted. The cellular phone as the communication terminal 4 is equipped with an application (an exclusive browser) for browsing contents of exclusive HTML (Hypertext markup language) tag description, which is accessible to the Internet. Moreover, the PDA or the compact general-purpose computer is also equipped with an application (browser/mailer application program) accessible to the Internet, which is a known structure.

Especially in the first embodiment having the structure to have described with reference to FIG. 1 to FIG. 3, the communication center apparatus 3 performs the route search, which has been traditionally performed inside the on-vehicle navigation apparatus, by the microprocessor 72 and the map information procession D/B device 74. Then, the communication center apparatus 3 obtains the coordinates information of a plurality of positions located on the optimum route as the result of the route search. The communication center apparatus 3 provides the coordinates information for the communication navigation terminal 5 by wireless transmission.

The communication navigation terminal 5 uses the coordinates information wirelessly transmitted from the communication center apparatus 3 to perform route display on a map road.

Incidentally, with respect to a sampling method or a distribution method of the plurality of positions at the communication center apparatus 3, there are various conceivable methods, and in response to this, there are conceivable various methods of displaying the optimum route on the basis of the coordinates information at the plurality of positions, which will be described later in detail (refer to FIG. 8 and so on).

On the other hand, the communication terminal 4 is constructed to give instructions of where to transmit the coordinates information as well as requesting the route search of the communication center apparatus 3. Incidentally, these kinds of route search requests and instructions of where to transmit can be performed from the communication navigation terminal 5 in the same manner as those from the communication terminal 4.

Especially in this embodiment, the map information processing D/B device 74 of the communication center apparatus 3 stores the map D/B information whose data volume is enormous and which includes a wider variety of information than the map data stored in the CD-ROM 33, the DVD-ROM 34, the HDD 36, or the like of the communication navigation terminal 5. Namely, the map D/B information includes the information for route search constructed by the link information, the node information, and the like, which cover road networks spread in a broad area such as throughout Honshu or the main island of Japan or throughout Japan and so on. The map D/B information further includes the map information for display of various scales. Moreover, the map D/B information includes data of added information, for example, such as map scales, guidance information of tourist attractions/facilities, facility numerals and the name (characters) of maps/roads, views of waters/railroads, and roads, on each map. Among them, especially the information for route search enables the route search based on the predetermined mathematical algorithm such as Dijkstra's algorithm or the like, and its data volume becomes enormous.

Furthermore, the search processing, which has the heavy load of processing based on the information for route search having this enormous data volume, is not performed on the side of the communication navigation terminal 5 but is executed on the side of the communication center apparatus 3 by the map information processing D/B device 74 and the microprocessor 72.

As described above, the CD-ROM 33, the DVD-ROM 34, the HDD 36, and the like of the communication navigation terminal 5 do not store the information for route search whose data volume is enormous, and their memory capacities are far smaller than that necessary for the map information processing D/B device 74, which is advantageous in view of simplifying the communication navigation terminal 5. Moreover, the route search based on the information for route search is not executed on the side of the communication navigation terminal 5, which causes the light load of processing in the system controller 20, so that it is again advantageous in view of simplifying the communication navigation terminal 5. Furthermore, the coordinates information at the plurality of positions is wirelessly transmitted as a result of the route search, and the information for route search or the like, which has an enormous data volume, is not wirelessly transmitted, so that it is extremely advantageous in view of reducing the volume of data to be transmitted and received and in view of relatively low capacities of transmission and reception at the communication center apparatus 3 and the communication navigation terminal 5.

The data processing in the first embodiment, as designed above, and in the second embodiment, as will be described later, is executed mainly by the CPU 22 of the communication navigation terminal 5 shown in FIG. 2 and the microprocessor 72 and the map information processing D/B device 74 of the communication center apparatus 3 shown in FIG. 3. More concretely, in addition to computer programs for controlling basic operations in the navigation system such as display of a current position, display of a map, or the like, computer programs associated with display control of the optimum route based on the coordinates information received from the communication center apparatus 3, transmission control of the route search request for the communication center apparatus 3, and the like are executed by the CPU 22 of the communication navigation terminal 5 shown in FIG. 2. On the other hand, computer programs associated with search control of the optimum route, reception control of the route search request, and the like are executed by the microprocessor 72 and the map information processing D/B device 74 of the communication center apparatus 3 shown in FIG. 3. The computer programs executed at the CPU 22 may be stored in a built-in memory device such as ROM23, RAM 24 or the like in the system controller 20 shown in FIG. 2, and they may be what are downloaded through the wireless communication device 38 or the like. On the other hand, the computer programs executed at the microprocessor 72 and the map information processing D/B device 74 may be stored in the memory device 76, the DVD-ROM 78, or the like shown in FIG. 3, and they may be what are downloaded through the circuit access device 71, the communication terminal 79, or the like.

Next, the whole of the operational flow mainly associated with display, search, search request, or the like of the optimum route in the first embodiment will be explained with reference to a sequence chart in FIG. 4 in addition to FIG. 1 to FIG. 3.

Figure 4:
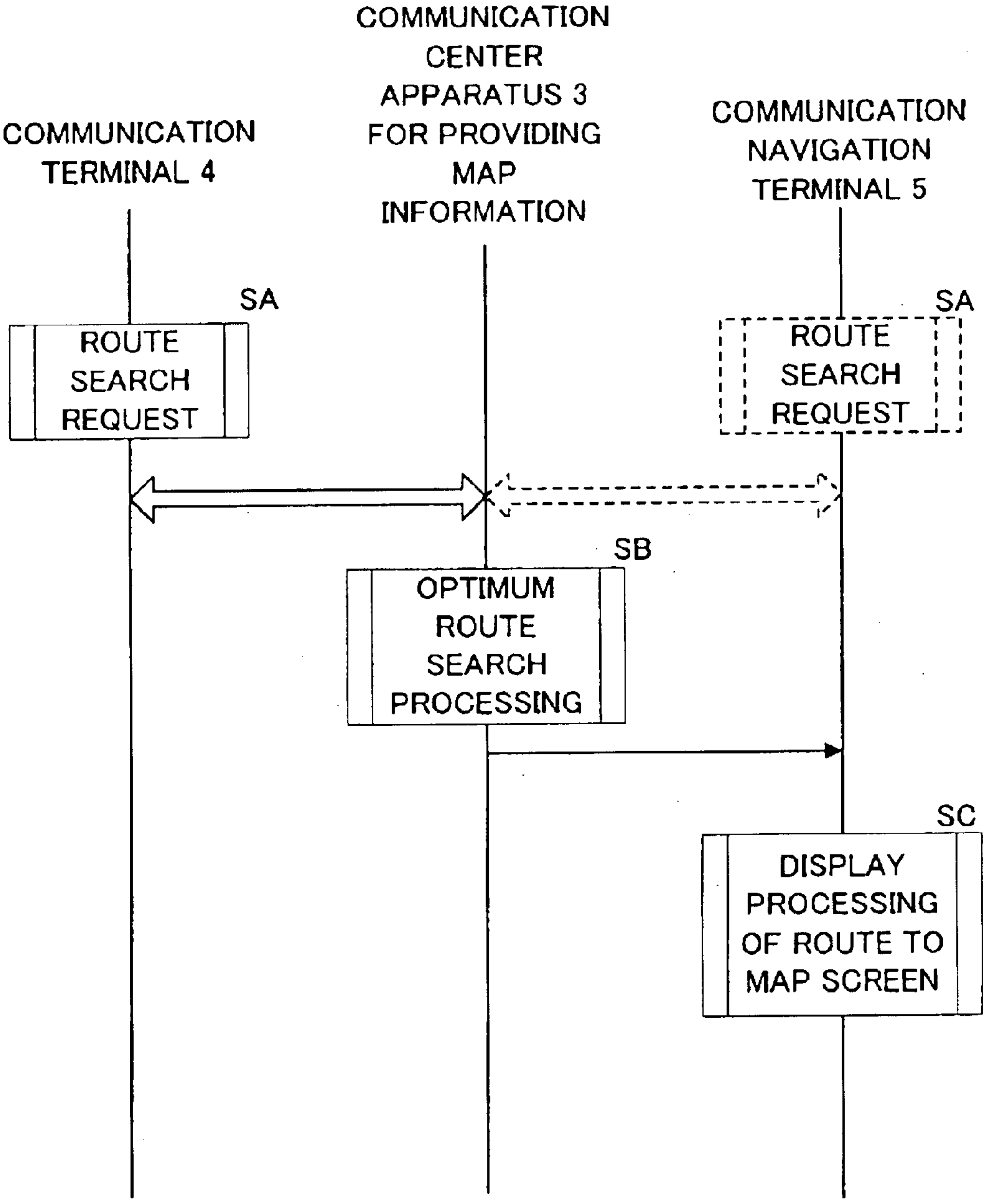
FIG. 4 is a sequence chart of transmission on a communication network in the first embodiment.

In FIG. 4, the route search request for an origin and a destination from the communication terminal 4 is firstly performed (step SA). In this case, one or a plurality of passing place may be included in the contents of the request in addition to the origin and the destination. The passing place means the place that exists between the origin and the destination and that is intended to be passed through, such as stopping place or the like. Incidentally, as described above, the route search request can be performed from the communication navigation terminal 5.

Secondly, as soon as the communication center apparatus 3 receives this route search request information, it executes a search for the optimum route corresponding to the route search request information. In other words, it performs the route search, which is conventionally performed by each navigation apparatus, and transmits to the communication navigation terminal 5 the coordinates information at the plurality of positions on the route which is obtained as the result of the search (step SB).

Then, the communication navigation terminal 5, which receives this coordinates information, executes display processing of matching the coordinates information with its own map information for display and screen-displays the optimum route from an origin to a destination with dashed lines, thick lines, and the like of specific colors on a map (step SC).

Figure 5:
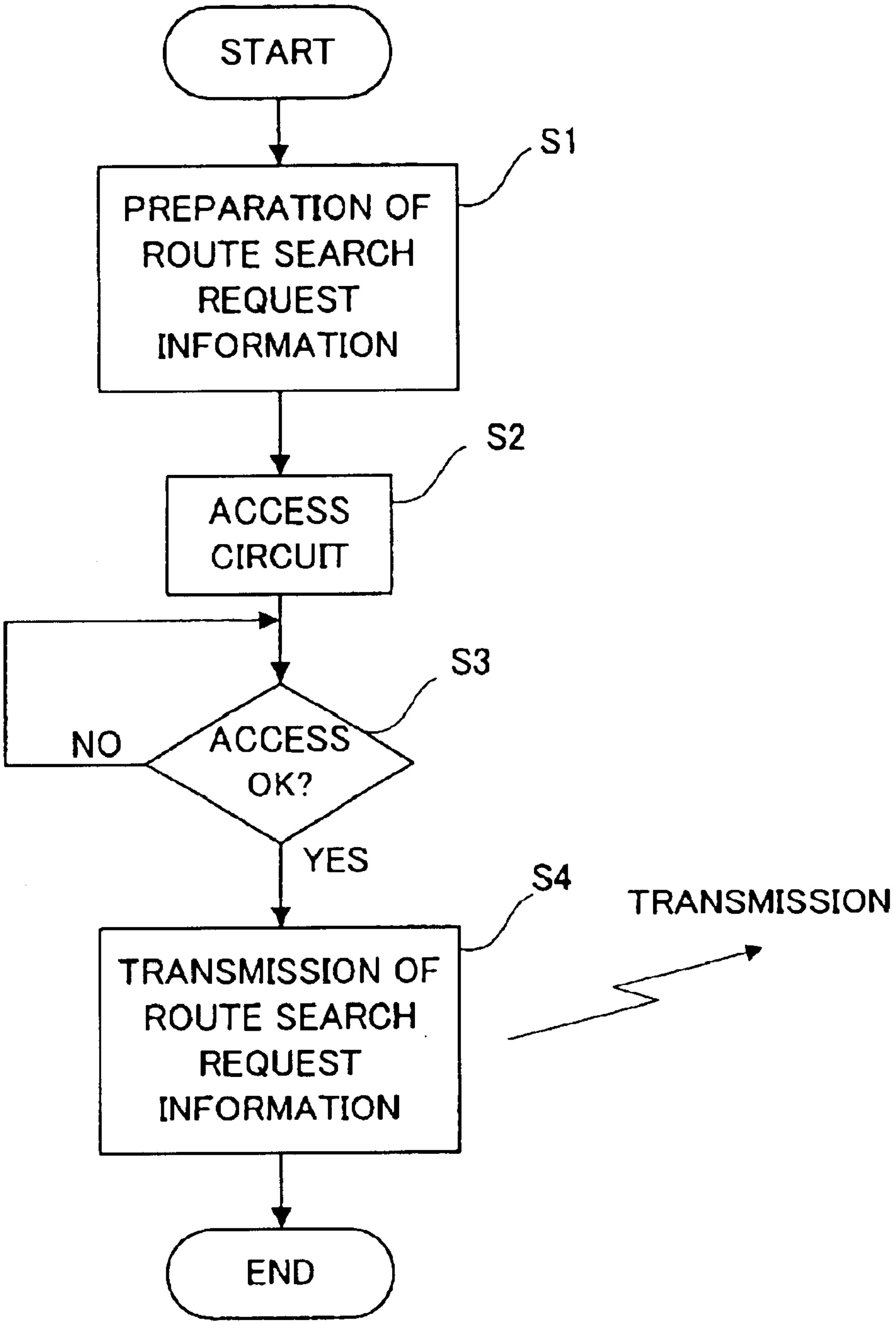
FIG. 5 is a flow chart showing processing procedures of route search request at a terminal apparatus in the first embodiment.

Next, the route search request (step SA in FIG. 4) by the communication terminal 4 shown in FIG. 4 will be further explained with reference to FIG. 5 and FIG. 6. FIG. 5 is a flow chart showing processing procedures of route search request at communication terminal 4 FIG. 6A and FIG. 6B are plan views showing display screens to explain the window screen of route search request.

In FIG. 5, the communication terminal 4 prepares the route search request information including information indicating an origin, a destination, a place to stop at, a destination date/time, where to transmit information, or the like, as will be described later, as well as information indicating request of searching for the optimum route (step S1).

Then, the communication terminal 4 accesses the communication center apparatus 3 with a password, an identification numeral (ID), or the like, which is given in advance (step S2 and step S3).

Then, the communication terminal 4 transmits the route search request information to the communication center apparatus 3 (step S4).

Figure 6A:
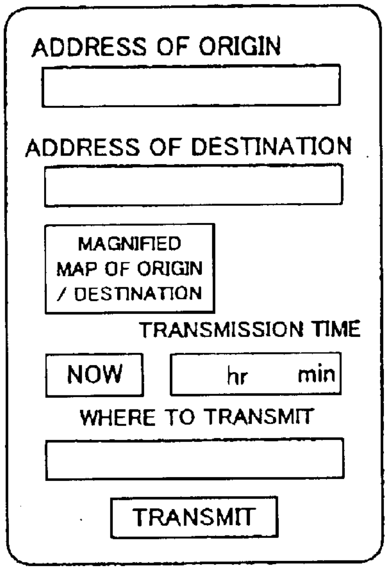
FIG. 6A and FIG. 6B are plan views showing display screens to explain window screens of route search request in the first embodiment.
Figure 6B:
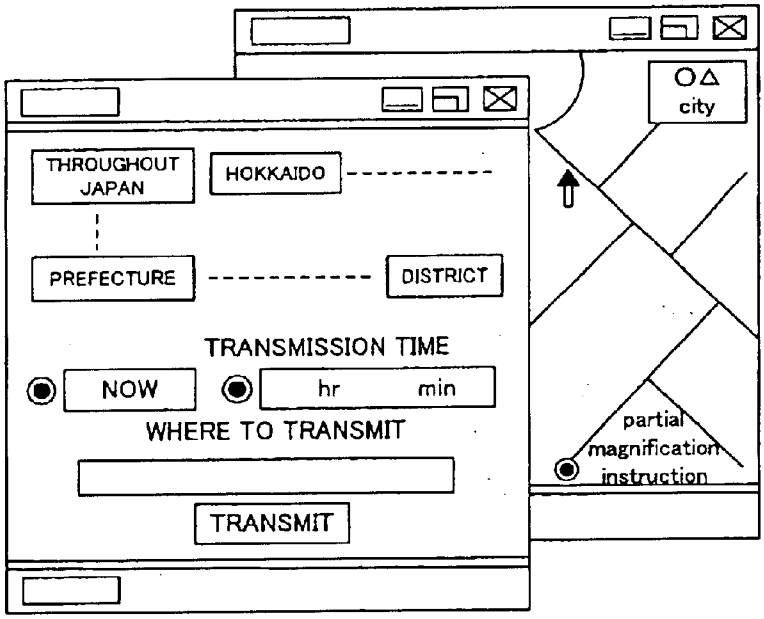

Here, as shown in FIG. 6A and FIG. 6B, there are the following two methods (A) and (B) to request the route search performed in step S1 to step S4.

(A) A Method of Transmitting the Route Search Request Information by E-Mail

In a transmission method under the TCP/IP environment, the communication terminal 4 executes a mailer application program to transmit the route search request information. In this case, the route search request information contains instructions of the request of a magnified map of an origin and a destination and a full-scale map between the origin and the destination as well as the address of the origin and the destination (the name of stations and districts are also available) as displayed in a screen window of the communication terminal 4 (an example of a cellular phone) shown in FIG. 6A. Moreover, this route search request information contains where to transmit (e.g. the address and the phone number of the communication navigation terminal 5) information indicating the searched optimum route (i.e. the coordinates information at the plurality of positions on the optimum route) from the communication center apparatus 3 as well as a transmission time (immediacy or designated time).

(B) A Method in the Case that the Communication Center Apparatus 3 is a Portal Site By browsing with a Web browser mounted on the communication terminal 4 (which is a compact general-purpose computer in this case), the communication center apparatus 3 is accessed and the object of a map menu "a map of the whole country, districts (tourist attractions etc.), prefecture and municipality unit, and so on" as shown in FIG. 6B, which is transmitted from the communication center apparatus 3, is designated. The map information by this designation is transmitted to the communication terminal 4 from the communication center apparatus 3. The communication terminal 4 side performs pointer instruction of a destination from an origin or that of a destination via passing places from the origin on this map screen and gives instructions of the route search request related to requirement of a magnified map as occasion demands. Moreover, it inputs where to transmit (e.g. the phone number and the address of the communication navigation terminal 5) information indicating the searched optimum route (i.e. the coordinates information at the plurality of positions on the optimum route) from the communication center apparatus 3 as well as the transmission time (immediacy or designated time). These pieces of instruction information are transmitted to the communication center apparatus 3 from the communication terminal 4 by executing a utility program at a browser.

Incidentally, it is also possible to input the address of the origin and the destination in the same manner as the above-described method (A) to request the route search, instead of the instruction of the object to the map menu.

Figure 7:
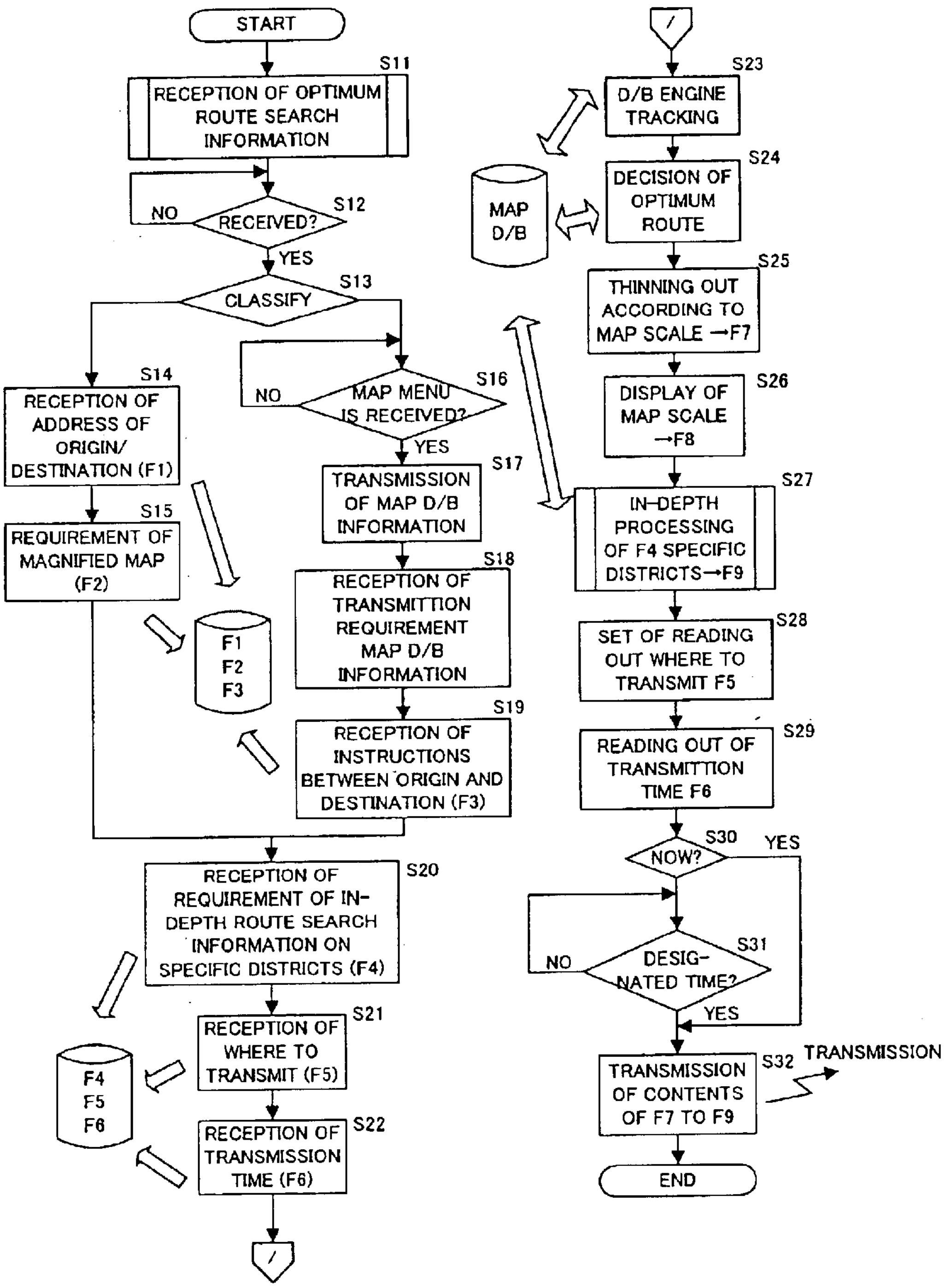
FIG. 7 is a flow chart showing processing procedures at a communication center apparatus for providing map information in the first embodiment.

Next, the search processing (step SB in FIG. 4) of the optimum route at the communication center apparatus 3 will be further explained with reference to FIG. 7 and FIG. 8. FIG. 7 is a flow chart showing processing procedures at the communication center apparatus 3 shown in FIG. 3. FIG. 8 is a schematic diagram to explain coordinates information, which the communication center apparatus 3 transmits to the communication navigation terminal 5.

Firstly, in FIG. 7, when the communication center apparatus 3 receives the route search request information from the communication terminal 4 (step S11 and step S12), the communication center apparatus 3 classifies the route search request information according to the contents of the route search request information (step S13). Namely, the classification is performed according to the contents of the route search request information instructed by the communication terminal 4 at the process of the route search request, as described with reference to FIG. 5 and FIG. 6, for example. More concretely, the classification is preformed according to the following information (a) to (i):

(a) information on the address (or the name of stations or districts) of an origin and a destination
(b) information on the requirement of a magnified map of an origin and a destination (or these and passing places) or a full-scale map between an origin and a destination
(c) information on the requirement of a map menu from the communication terminal 4
(d) transmission of map information on a map menu from the communication center apparatus 3
(e) information on reception of the instruction of a transmission requirement map screen (a map menu) at the communication terminal 4

(f) information on reception of instructions between an origin and a destination from the communication terminal 4

(g) information on reception of the requirement of guidance information indicating in detail specific districts from the communication terminal 4

(h) information on reception of where to transmit (phone number and address) from the communication terminal 4

(i) information on reception of a transmission time (immediacy or designated time) from the communication terminal 4

Among them, instructions of the above two pieces of information (a) and (b) are given by email in FIG. 6A as described above. Moreover, the above four pieces of information (c) to (f) are executed through a portal site screen in FIG. 6B.

Then, after the distribution processing in step S13, the contents of the above pieces of information (a) and (b) are temporarily stored and flag F1 and flag F2 are set in respective one of files (step S14 and step S15). Moreover, the above pieces of information (c), (d), (e), and (f) are processed and flag F3 is set to the content of the information (f) (step S16 to step S19). Furthermore, the above pieces of information (g), (h), and (i) are processed and flag F4, flag F5, and flag F6 are set to the contents of these three pieces of information, respectively and in this order (step S20 to step S22).

Then, the information contents (origin/destination) of the flag F1 in step S14 and the flag F3 in step S19 are incorporated and tracking by a D/B engine is executed at the map information processing D/B device 74 (step S23) to perform the route search (step S24). This tracking is performed with respect to many pieces of map information (drawings) in some cases according to the range of an origin and a destination of the route search request. Here, it will be explained under the assumption that the tracking is executed with respect to one piece of map information (drawings). In this case, a route which has the shortest driving distance and/or which has the shortest driving time is chosen and stored as the optimum route by executing cost calculation, for example.

Then, the coordinates information which is unnecessary is thinned out from coordinates information rows at respective positions on this optimum route in response to the scale of the map information. Flag F7 is set to the coordination information rows which are thinned out on the optimum route (step S25). In thinning process, the rate of thinning (the degree of the thinning) is based on the scale of the map corresponding to the information for route search used when searching for the optimum route. Moreover, flag F8 is set to the scale of the map (e.g. 1/xxx) corresponding to the information for route search used when searching for the optimum route (step S26).

Incidentally, for example, in the case that there is an expressway between the origin and the destination, the coordinates information between the entrance and the exit of this expressway may be thinned out. Alternatively, in the case that it is relatively distant between the origin and the destination and that there is a road given to a name (e.g. Route 1) between them, again, the coordinates information on the coordinates information rows on the optimum route between a connection part on this road (entrance) and a connection part on another road (exit) may be thinned out.

This thinning reduces the data volume (traffic volume) of the coordinates information rows of the optimum route when wirelessly transmitting it to the communication navigation terminal 5 from the communication center apparatus 3, so that congestion at the communication center apparatus 3 may be hardly generated, which makes it easy to access respective one of circuits with respect to many route search requests.

Moreover, for example, in the case that an origin and a destination are set in a relative broad area on a map of a country, even if some of the coordinates information row of each road that is located between a plurality of main highways we pass through (a road between the entrance and the exit of each main highway) are thinned out, a user has no difficulty in its driving. Therefore, if a thinning condition (rate) is variable for each map scale, the data volume (the traffic volume) is more reduced when transmitting it to the communication navigation terminal 5 from the communication center apparatus 3 while enabling a good display of the optimum route.

Figure 8A:
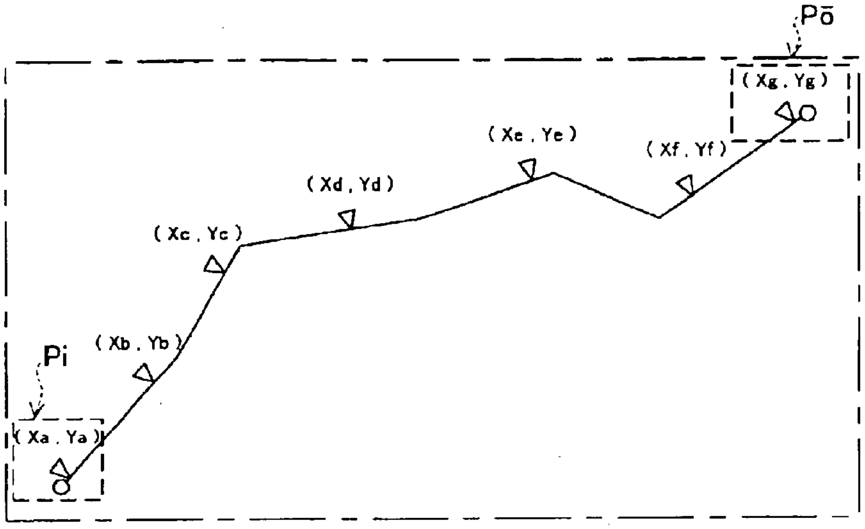
FIG. 8A to FIG. 8C are schematic diagrams to explain coordinates information rows on an optimum route in the first embodiment.
Figure 8B:
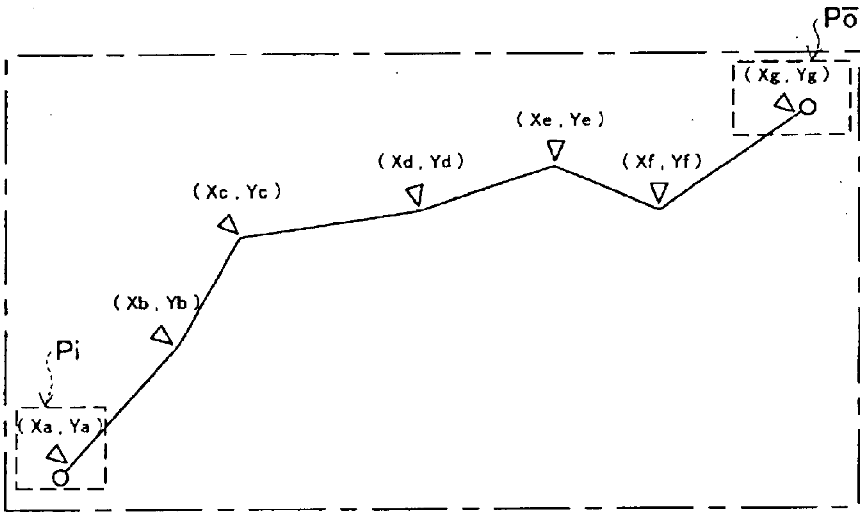
Figure 8C:
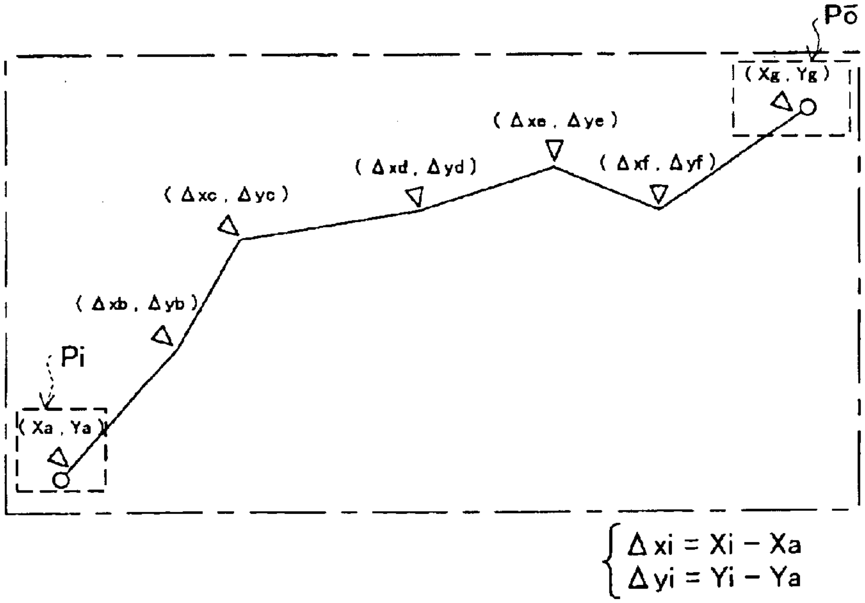

Here, examples of the coordinates information of the plurality of positions defining the optimum route are shown in FIG. 8A to FIG. 8C.

In the example in FIG. 8A, the plurality of positions are positioned relatively equally on the optimum route shown in solid line. The coordinates information at each position (Xi, Yi) is absolute coordinates as is the case with the origin (wherein i=a, . . . , g). The interval between positions in this example may be set according to the map scale when performing the route search, such as every 10 m, every 100 m, every 1 km, or the like, or it may be fixed regardless of the map scale.

In the example in FIG. 8B, the plurality of positions are placed at connecting positions of respective line segments in the case of the approximation of the optimum route with the line segments. Then, again in this case, the coordinates information at each position (Xi, Yi) is absolute coordinates as is the case with the origin.

In the example in FIG. 8C, as is the case with the example in FIG. 8B, the plurality of positions are placed at connecting positions of respective line segments in the case of the approximation of the optimum route with the line segments. However, the coordinates at each position is relative coordinates (Δxi, Δyi) that is a variation with an origin's coordinates (Xa, Ya) as a standard (wherein Δxi=Xi−Xa, Δyi=Yi−Ya). By constituting in this manner, the data volume (the traffic volume) is more reduced when wirelessly transmitting. Incidentally, it may be relative coordinates that is a variation with an destination's coordinates (Xg, Yg) as a standard.

Furthermore, in the case that there are two or more choices with respect to the driving ways at an intersection, a branching point, an interchange, and the like (these are preferable positions to perform route navigation at in the communication navigation operation), these positions may be used as or added to "the plurality of positions" on which the coordinates information is based, and such coordinates information may be transmitted.

In addition to these examples, the type of the coordinates information and the distribution method of the plurality of positions, which enable mapping (adaptation display processing) onto a road on the side of the communication navigation terminal 5, which will be explained later, are preferably employed. It is also possible to employ the type of the coordinates information and the distribution method of the plurality of positions, which are not enough to enable this kind of mapping, if it is enough to recognize this plotting as a route on a display screen when plotting the plurality of positions on a map on the side of the communication navigation terminal 5.

Then, in the case that the information contents corresponding to the flag F4 is stored (i.e. in the case that information indicating in detail a specific district Po of a destination or a specific district Pi of an origin shown in FIG. 8 is being required), the route search is processed as is the case with the optimum route search of an origin and a destination described above. Namely, the optimum route search indicating in detail the specific district Po or Pi required from the communication terminal 4 is executed with the tracking by the D/B engine at the map information processing D/B device 74 and the searched route is extracted. The specific district Po or Pi is an area surrounding stations of an origin and a destination, for example. Then, the optimum route that has the shortest driving route is chosen, for example, and flag F9 is set to coordinates information rows defining the optimum route (step S27).

Then, the information contents corresponding to the flag F5 (phone number and address of where to transmit) is incorporated and is set to the communication control device 73 in FIG. 3 (step S28).

Then, the information contents corresponding to the flag F6 (transmission time) is read out (step S29). In the case that immediacy is designated (step S30: YES), the information contents corresponding to the flag F7 (the coordinates information defying the whole of the optimum route in the processing in step S25) (between an origin and a destination), the information contents corresponding to the flag F8 (scale information), and the information contents corresponding to the flag F9 (the coordinates information rows defining the optimum route in specific districts in the processing in step S27), all of which are stored in the memory device 76 and/or the map information processing D/B device 74, are transmitted to the communication circuit network from the communication control device 73 with respect to the phone number and the address of the communication navigation terminal 5 (step S32). In the case that it is not necessary to transmit immediately (not-immediate transmission) in step S30, i.e. in the case that the transmission time is designated (step S30: NO), when the time is measured with the time circuit 82 (step S31), the information contents corresponding to the flag F7, the flag F8, and the flag F9 are transmitted as is the case with the immediate transmission described above (step S32).

In the search processing of the optimum route, the optimum route that has the shortest driving distance, for example, is chosen among a plurality of routes, which are obtained by the processing. However, it is possible to perform weighting and choose the substantial optimum route. For example, it is also possible to choose the optimum route, which consequently has the shortest driving time after considering traffic congestion with traffic information (VICS: Vehicle Information and Communication System).

Figure 9:
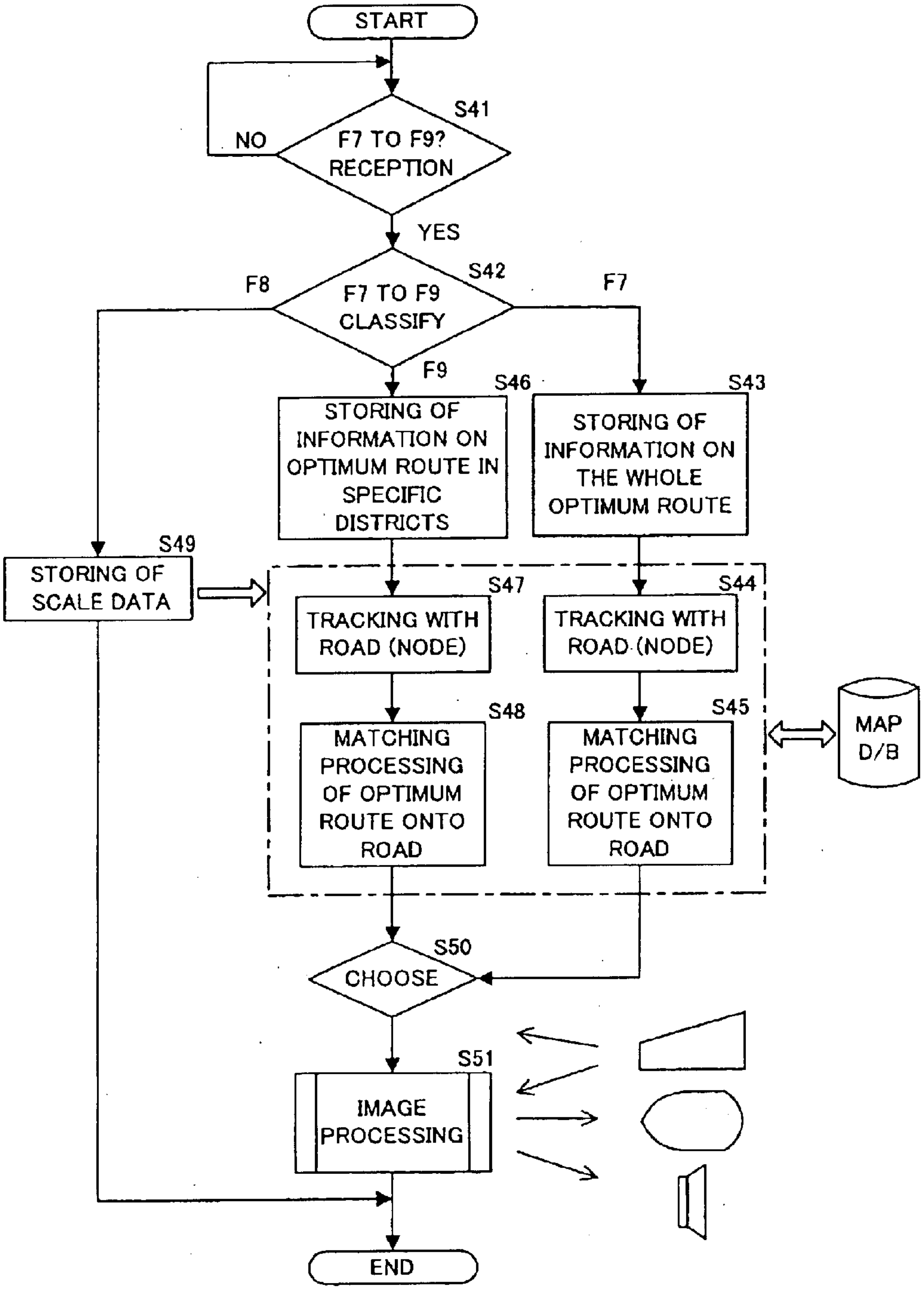
FIG. 9 is a flow chart showing processing procedures at the communication navigation terminal in the first embodiment.

Next, the process (i.e. step SC in FIG. 4) of specifying or choosing the optimum route from among many roads shown with map information for display or road map information on the basis of the coordinates information received on the side of the communication navigation terminal 5 to display as a road map including the optimum route will be further explained with reference to FIG. 9 and FIG. 10. FIG. 9 is a flow chart showing processing procedures at the communication navigation terminal 5 shown in FIG. 2. FIG. 10A to FIG. 10C are plan views showing display screens to explain a road map displaying an optimum route.

In FIG. 9, when the communication navigation terminal 5 receives the information contents of the flag F7, the flag F8, and the flag F9 from the communication center apparatus 3 (step S41), the communication navigation terminal 5 classifies the information contents of these flags F7 to F9 (step S42). Then, the coordinates information rows of the whole of the optimum route corresponding to the flag F7 is filed (step S43). Then, tracking is performed by the D/B engine for a node intersection (coordinates information/latitude and longitude) on a road on a map shown with the map information for display, which is owned in advance on the side of the communication navigation terminal 5, with respect to the latitude and the longitude of the respective coordinates information rows (refer to FIG. 8) of the whole of the optimum route, and their mapping is performed (step S44 and step S45). The map information for display is information read out to the hard disk device 36 from the CD-ROM drive 31 or the DVD-ROM drive 32 in FIG. 2. In the tracking process by the D/B engine, a node intersection (coordinates information/latitude and longitude) on a road shown with this map information for display and the coordinates information rows (refer to FIG. 8) of the whole of the optimum route are arranged onto the road such that they matches the road.

In the same manner, the coordinates information rows of the optimum route in the specific districts corresponding to the flag F9 to have been classified in step S42 is filed (step S46) and mapping and tracking are performed as is the case with the coordinates information rows of the whole of the optimum route corresponding to the flag F7 described above (step S47 and step S48).

As for the tracking and the mapping, they are separately and preferably referred to the scale information (scale flag) corresponding to the flag F8 to have been classified in step S42 and are executed to a map of the same scale at the hard disk device 36 in FIG. 2 (step S49). The processing data of step S45 and step S48 obtained above are chosen by operating the input device 60 in FIG. 2 and its screen display is performed (step S50 and step S51).

Incidentally, if using the scale information (scale flag) for the coordinates information rows as described above, even if the scale of a display map is changed at the communication navigation terminal 5, it is possible to perform the mapping of the coordinates information rows onto a road on a map relatively easily.

FIG. 10A to FIG. 10C show screens displayed in the above manner. In FIG. 10A, the optimum route chosen or specified on the basis of the coordinates information rows in FIG. 8 is shown in a thick line. Incidentally, this figure illustrates a current position of a vehicle as a reference. Moreover, maps obtained in the case that an area surrounding a station as the specific district Pi of an origin and that as the specific district Po of a destination shown in FIG. 8 are chosen are respectively shown in FIG. 10B and FIG. 10C.

Incidentally, this screen display is the same as the case of a single use when mounting the navigation apparatus on a vehicle as is the existing manner and it is performed along with guidance information as sound or the like. Onto the display screen, a display road map, a location of a vehicle, a moving direction, a scale circle/radius, a driving locus, map directions, or the like, all of which are not illustrated in FIG. 10A to FIG. 10C, are given. In addition, various guidance in driving of a vehicle, e.g. the guidance of facilities and that of moving directions performed just before reaching the node intersection according to route guidance information and further facility guidance information, which are newly generated depending on the optimum route on the side of the communication navigation terminal 5 or which are generated on the side of the communication center apparatus 3 and then transmitted with the coordinates information rows, is performed as well. The operations of these various types of guidance, their choosing instructions, and the like are well known, and their detailed explanations are omitted here.

As described above, at the communication navigation terminal 5, it is not necessary to execute the optimum route search that has the enormous number of processing steps. In other words, it becomes possible to execute more control processing in a control system, which may develop multi-functionalization (e.g. unification with a television apparatus, an audio apparatus, and the like).

(II) Second Embodiment

Figure 11:
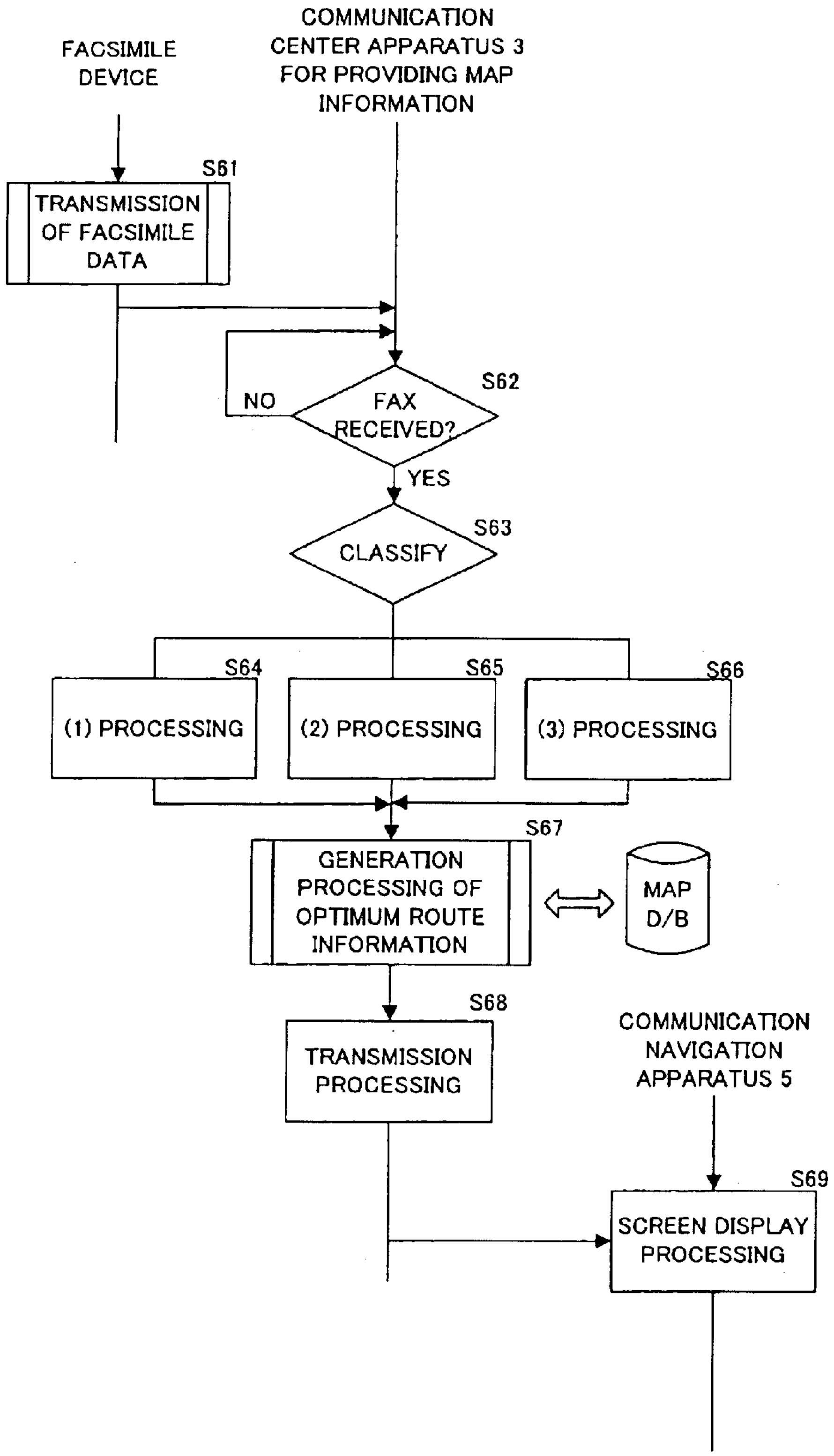
FIG. 11 is a sequence chart of transmission in a second embodiment.

Next, the second embodiment will be explained with reference to FIG. 1 to FIG. 3 and FIG. 11. The whole of the structure of the second embodiment is the same as that of the first embodiment shown in FIG. 1 to FIG. 3. FIG. 11 is a flow chart showing processing procedures of main parts at the communication center apparatus 3 in the second embodiment.

In FIG. 11, route search request is performed from a facsimile device (not illustrated in FIG. 11) in the second embodiment instead of the communication terminal 4 (or the communication navigation terminal 5) used in the first embodiment. Hereunder, the extraction of route search request information at the communication center apparatus 3 will be explained.

In FIG. 1 to FIG. 3 and FIG. 11, the communication control device in the communication center apparatus 3 in FIG. 3 mounts therein a facsimile transmission, e.g. a communication protocol in G3 method and/or G4 method of ITU-T/T.30 recommendation.

In the route search request by facsimile communication, firstly, the route search request information by processings (1), (2), or (3), which will be explained below, is transmitted to the communication center apparatus 3 from the facsimile device (step S61). This route search request information includes a phone number of where to transmit, an address of a destination from a desired origin in the same manner of that in the first embodiment. At the communication center apparatus 3, the route search request information obtained by using the facsimile device is received (step S62) and the classification of it is performed (step S63). At the communication center apparatus 3, the route search request information is obtained by the following (1) to (3) (step S64 to step S66).

(1) The route search request information is stored in a nonstandard procedure area (free area to use) in a transmission format or the like in G3 method standard of ITU-T/T.30 recommendation and it is transmitted to the communication center apparatus 3 from the facsimile device. The communication center apparatus 3 extracts the route search request information from the nonstandard procedure area.

(2) The route search request information is described in a facsimile document and it is transmitted to the communication center apparatus 3 from the facsimile device. The communication control device 73 (refer to FIG. 3) of the communication center apparatus 3 extracts the route search request information by known Character Recognition.

(3) The communication center apparatus 3 decodes a dual tone signal (a signal having two mixed frequency allocated for each DTMF/key) in a push button (PB) phone method to extract the route search request information, which is determined in advance.

Other processings are performed in the same manner as those in the first embodiment (step S67 to step S69) and the optimum route is screen-displayed on a map at the communication navigation terminal 5.

As described above, in the second embodiment, it becomes possible to transmit route search request information from a facsimile device, so that even if the communication terminal 4 and the communication navigation terminal 5 cannot be used at a place we moved to (e.g. out of a communication service area), it becomes possible to request and provide the optimum route.

Incidentally, we explained each embodiment described above with such an example that the communication center apparatus 3 is installed at the digital fixed communication circuit network 1 and that the communication navigation terminal 5 is mounted on a vehicle; however, the present invention is not limited to this. For example, it is within the scope of designed matters of the present invention that the communication center apparatus 3 is installed at a satellite station and/or a station on the earth in satellite communication and the present invention is used for a communication navigation system on a global scale with the communication navigation terminal 5 as a mobile or hand-carry type.

Moreover, each embodiment described above may be designed such that typical navigation operations such as display of a surrounding map of a current position, display of the current position on the surrounding map, display of facility guidance information, or the like are at least partially performed on the side of the communication center apparatus 3 in the same manner as the search processing of the optimum route described above. Alternatively, it may be designed such that the typical navigation operations in this kind are performed on the side of the communication navigation terminal 5 for a vehicle by using various pieces of information stored in the CD-ROM 33 or the DVD-ROM 34 aside from the search processing of the optimum route described above.

Furthermore, the communication navigation terminal 5 of the present invention may be applied for various navigation terminals, not for a vehicle as described in each embodiment above, but for various movable bodies such as an airplane, a ship, a bicycle, or the like. It may be further applied for those for an animal and a pedestrian, who uses a mobile phone, a mobile or hand-carry type information terminal, or the like.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No 2001-266463 filed on Sep. 3, 2001 including the specification, claims, drawings and summary is incorporated herein by reference in its entirety.

What is claimed is:

1. A communication navigation system comprising a communication center apparatus and a communication navigation terminal, (i) the communication center apparatus comprising:

a map database for storing therein map database information including information for route search, which enables a search for an optimum route from an origin to a destination by predetermined algorithm;

a search device for searching for the optimum route with respect to route search request information that indicates the origin and the destination and that is received through the communication network, on the basis of the information for route search by the predetermined algorithm; and a center side communication device for wirelessly transmitting, through the communication network, coordinates information at a plurality of positions arranged on the searched optimum route, and (ii) the communication navigation terminal comprising:

a terminal side communication device for receiving the coordinates information wirelessly transmitted; and a display processing device for displaying the optimum route on a map on the basis of the received coordinates information and map information for display.

2. A communication navigation system according to claim 1, wherein the terminal side communication device transmits the route search request information and the center side communication device receives the route search request information.

3. A communication navigation system according to claim 1, further comprising a user communication terminal, which performs two-way communication on the communication network and which transmits the route search request information.

4. A communication navigation system according to claim 1, wherein the center side communication device further transmits order information that indicates order of the plurality of positions arranged on the optimum route, and the display processing device displays the optimum route on the basis of the order information in addition to the coordinates information.

5. A communication navigation system according to claim 1, wherein the coordinates information includes latitude and longitude, or latitude, longitude and altitude at the plurality of positions on the optimum route.

6. A communication navigation system according to claim 1, wherein the coordinates information includes information that indicates absolute coordinates of at least one of the plurality of positions on the optimum route, and information that indicates relative coordinates of at least another one of the plurality of positions on the optimum route with respect to the absolute coordinates.

7. A communication navigation system according to claim 1, wherein the route search request information indicates at least one passing place that exists between the origin and the destination and that is intended to be passed through in addition to the origin and the destination and the search device searches for the optimum route with respect to the route search request information indicating the origin, the destination and the at least one passing place.

8. A communication navigation system according to claim 1, wherein the number of the plurality of positions is varied with a scale of a map corresponding to map information used for the search for the optimum route at the search device.

9. A communication navigation system according to claim 1, wherein the map database information includes map information having a scale equal to chat of the map information for display to be used at the display processing device, and the search device searches for the optimum route on the basis of the map information included in the map database information.

10. A communication navigation system according to claim 9, wherein the center side communication device receives scale information indicating a scale of the map information for display to be used at the display processing device together with the route search request information, and the search device selects map information having a scale equal to that indicated by the received scale information from among a plurality of map information having various scales, and searches for the optimum route on the basis of the selected map information.

11. A communication navigation system according to claim 1, wherein the center side communication device transmits scale information that indicates a scale of map information which is used for the search for the optimum route at the search device.

12. A communication navigation system according to claim 1, wherein the route search request information comprises screen information including character information, and is transmitted and received according to a two-way communication method.

13. A communication navigation system according to claim 1, wherein the route search request information includes character information, and is transmitted and received according to a one-way communication method.

14. A communication navigation system according to claim 1, wherein the route search request information includes transmission time information indicating a time point supposed to transmit the coordinates information, the communication center apparatus further comprises a timing device for measuring a time point shown by the transmission time information and the center side communication device transmits the coordinates information at the time point shown by the transmission time information according to the time measurement by the timing device.

15. A communication center apparatus for performing communication with a navigation terminal on a communication network, comprising:

a map database for storing therein map database information including information for route search, which enables a search for an optimum route from an origin to a destination on a map by predetermined algorithm;

a search device for searching for the optimum route with respect to route search request information that indicates the origin and the destination and that is received through the communication network, on the basis of the information for route search by the predetermined algorithm; and a center side communication device for transmitting, through the communication network, coordinates information at a plurality of positions arranged on the searched optimum route.

16. A communication navigation terminal for performing two-way communication with a communication center apparatus on a communication network, the communication center navigation comprising: a map database for storing therein map database information including information for route search, which enables a search for an optimum route from an origin to a destination by predetermined algorithm; a search device for searching for the optimum route with respect to route search request information that indicates the origin and the destination and that is received through the communication network, on the basis of the information for route search by the predetermined algorithm; and a center side communication device for wirelessly transmitting, through the communication network, coordinates information at a plurality of positions arranged on the searched optimum route, the communication navigation terminal comprising:

a terminal side communication device for receiving the coordinates information wirelessly transmitted; and a display processing device for displaying the optimum route on a map on the basis of the received coordinates information and map information for display.

17. A communication navigation method executed in a communication navigation system comprising a communication center apparatus and a communication navigation terminal, which perform two-way communication on a communication network, the communication navigation method comprising:

(i) at the communication center apparatus:

a search process of searching, by a predetermined algorithm, for an optimum route from a origin to a destination with respect to route search request information that indicates the origin and the destination and that is received through the communication network, on the basis of information for route search which is included in map data base information stored in a map database and which enables a search for the optimum route from the origin to the destination according to the predetermined algorithm; and a center side communication process of wirelessly transmitting, through the communication network, coordinates information at a plurality of positions arranged on the searched optimum route, and (ii) at the communication navigation terminal:

a terminal side communication process of receiving the coordinates information wirelessly transmitted; and a display process of displaying the optimum route on a map on the basis of the received coordinates information and map information for display.

18. A program storage device readable by a computer for tangibly embodying a program of instructions executable by the computer to perform a communication navigation method at a communication center apparatus in a communication navigation system, the communication navigation system comprising the communication center apparatus and a communication navigation terminal, the communication center apparatus performing two-way communication on a communication network with the communication navigation terminal, the communication navigation terminal comprising: a terminal side communication device for receiving coordinates information wirelessly transmitted; and a display processing device for displaying an optimum route from an origin to a destination on a map on the basis of the received coordinates information and map information for display, the communication navigation method comprising:

a search process of searching, by a predetermined algorithm, for the optimum route with respect to route search request information that indicates the origin and the destination and that is received through the communication network, on the basis of information for route search which is included in map data base information stored in a map database and which enables a search for the optimum route from the origin to the destination according to the predetermined algorithm; and a center side communication process of wirelessly transmitting, through the communication network, the coordinates information at a plurality of positions arranged on the searched optimum route.

19. A program storage device readable by a computer for tangibly embodying a program of instructions executable by the computer to perform a communication navigation method at a communication navigation terminal in a communication navigation system, the communication navigation system comprising a communication center apparatus and the communication navigation terminal, the communication navigation terminal performing two-way communication on a communication network with the communication center apparatus, the communication center apparatus comprising: a map database for storing therein map database information including information for route search, which enables a search for an optimum route from an origin to a destination by predetermined algorithm; a search device for searching for the optimum route with respect to route search request information that indicates the origin and the destination and that is received through the communication network, on the basis of the information for route search by the predetermined algorithm; and a center side communication device for wirelessly transmitting, through the communication network, coordinates information at a plurality of positions arranged on the searched optimum route, the communication navigation method comprising:

a terminal side communication process of receiving the coordinates information wirelessly transmitted; and a display process of displaying the optimum route on a map on the basis of the received coordinates information and map information for display.

20. A computer data signal embodied in a carrier wave and representing a series of instructions which cause a computer to perform a communication navigation method at a communication center apparatus in a communication navigation system, the communication navigation system comprising the communication center apparatus and a communication navigation terminal, the communication center apparatus performing two-way communication on a communication network with the communication navigation terminal, the communication navigation terminal comprising: a terminal side communication device for receiving coordinates information wirelessly transmitted; and a display processing device for displaying an optimum route from an origin to a destination on a map on the basis of the received coordinates information and map information for display, the communication navigation method comprising:

a search process of searching, by a predetermined algorithm, for the optimum route with respect to route search request information that indicates the origin and the destination and that is received through the communication network, on the basis of information for route search which is included in map data base information stored in a map database and which enables a search for the optimum route from the origin to the destination according to the predetermined algorithm; and a center side communication process of wirelessly transmitting, through the communication network, the coordinates information at a plurality of positions arranged on the searched optimum route.

21. A computer data signal embodied in a carrier wave and representing a series of instructions which cause a computer to perform a communication navigation method at a communication navigation terminal in a communication navigation system, the communication navigation system comprising a communication center apparatus and the communication navigation terminal, the communication navigation terminal performing two-way communication on a communication network with the communication center apparatus, the communication center apparatus comprising: a map database for storing therein map database information including information for route search, which enables a search for an optimum route from an origin to a destination by predetermined algorithm; a search device for searching for the optimum route with respect to route search request information that indicates the origin and the destination and that is received through the communication network, on the basis of the information for route search by the predetermined algorithm; and a center side communication device for wirelessly transmitting, through the communication network, coordinates information at a plurality of positions arranged on the searched optimum route, the communication navigation method comprising:

a terminal side communication process of receiving the coordinates information wirelessly transmitted; and a display process of displaying the optimum route on a map on the basis of the received coordinates information and map information for display.

22. The communication navigation system as claimed in claim 1, wherein the communication center apparatus and the communication navigation terminal perform two-way communication on a communication network.

23. A communication navigation terminal, comprising:

a communication device that receives coordinates information from a remote source after a request for an optimum route is sent to the remote source; and a display processing device that displays the optimum route on a map on the basis of the received coordinates information and map information for display.

24. The communication navigation terminal as claimed in claim 23, wherein the request for the optimum route is sent from the communication device to the remote source.

25. The communication navigation system as claimed in claim 1, wherein the map information corresponding to the received coordinates information is located at said communication navigation terminal and is not transmitted in conjunction with the received coordinates information.

26. The communication navigation system as claimed in claim 23, wherein said coordinates information is not transmitted in conjunction with the map information.

27. The communication navigation system as claimed in claim 23, wherein the map information corresponding to the received coordinates information is located at the communication navigation terminal and is not transmitted in conjunction with the received coordinates information.

28. The communication navigation system as claimed in claim 23, wherein said coordinate information is transmitted in conjunction with no other map information.

29. The communication navigation system as claimed in claim 1, wherein said coordinates information is transmitted in conjunction with no other map information.

30. A communication navigation system, comprising:

a mobile navigation terminal; and a transmission circuit that wirelessly communicates with the mobile navigation terminal, wherein the transmission circuit transmits coordinate information to the mobile navigation terminal, wherein the mobile navigation terminal generates route data based on the received coordinate information and map information, and wherein the map information corresponding to the received coordinate information is located at said mobile navigation terminal and is not transmitted to the mobile navigation terminal in conjunction with the coordinate information.

31. The communication navigation system as claimed in claim 30, wherein the coordinate information is transmitted in conjunction with no other map information.

* * * * *